US012630478B1

(12) United States Patent
Yaseri

(10) Patent No.: US 12,630,478 B1
(45) Date of Patent: May 19, 2026

(54) METHOD OF CARBON MINERALIZATION

(71) Applicant: King Fahd University of Petroleum and Minerals, Dhahran (SA)

(72) Inventor: Ahmed Zarzor Hussien Yaseri, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/376,195

(22) Filed: Oct. 31, 2025

(51) Int. Cl.
| | |
|---|---|
| *C04B 35/00* | (2006.01) |
| *C04B 35/515* | (2006.01) |
| *C04B 35/626* | (2006.01) |
| *C04B 35/632* | (2006.01) |

(52) U.S. Cl.
CPC ...... *C04B 35/515* (2013.01); *C04B 35/62605* (2013.01); *C04B 35/632* (2013.01); *C04B 2235/3201* (2013.01); *C04B 2235/3206* (2013.01); *C04B 2235/3208* (2013.01); *C04B 2235/442* (2013.01); *C04B 2235/444* (2013.01); *C04B 2235/448* (2013.01); *C04B 2235/94* (2013.01)

(58) Field of Classification Search
CPC ............ C04B 35/515; C04B 35/62605; C04B 35/632; C04B 2235/3201; C04B 2235/3206; C04B 2235/3208; C04B 2235/442; C04B 2235/444; C04B 2235/448; C04B 2235/94
USPC ...................................................... 106/286.6
See application file for complete search history.

(56) References Cited

U.S. PATENT DOCUMENTS

| | | | |
|---|---|---|---|
| 7,914,685 B2 * | 3/2011 | Constantz | ............... C02F 1/683 |
| | | | 423/220 |
| 10,995,262 B2 * | 5/2021 | Peng | ........................ E21B 43/26 |
| 2024/0390839 A1 * | 11/2024 | Bosch | ................ B01D 53/1493 |

FOREIGN PATENT DOCUMENTS

| | | |
|---|---|---|
| CN | 104477950 B | 5/2016 |
| KR | 10-1816677 B1 | 1/2018 |
| WO | WO 2025/052156 A1 | 3/2025 |

OTHER PUBLICATIONS

Paulo Henrique Alves de Azevedo, et al., "Efficient $CO_2$ capture using aminated surfactant in oily and saline formulations", Colloids and Surfaces A: Physicochemical and Engineering Aspects, vol. 725, Part 2, Jul. 3, 2025, Excerpts only, 6 pages.

(Continued)

*Primary Examiner* — James E Mcdonough
(74) *Attorney, Agent, or Firm* — Oblon, McClelland, Maier & Neustadt, L.L.P.

(57) ABSTRACT
A method of carbon mineralization includes exposing a solution including a plurality of metal salts and a surfactant to carbon dioxide at a pressure in a range from 300 to 700 pounds per square inch (PSI) to form a carbonated solution. The method further includes adding a base to the carbonated solution until the pH is above 10 to form a reaction mixture and reacting the reaction mixture to form mineral precipitates. The carbon dioxide reacts with the metal salts to form the mineral precipitates. The surfactant includes a tertiary amine including one alkyl group and two ethoxylate groups including two or more ethoxy units. The mineral precipitates include calcite, portlandite, brucite and halite. The mineral precipitates are in the form of particles having an average size in a range from 1 to 75 μm.

20 Claims, 22 Drawing Sheets

(56) References Cited

OTHER PUBLICATIONS

Leyu Cui, et al., "Mobility of Ethomeen C12 and Carbon Dioxide (CO2) Foam at High Temperature/High Salinity and in Carbonate Cores", SPE Journal, vol. 21, Issue 04, Aug. 15, 2016, pp. 1151-1163, Summary Only, 6 pages.

* cited by examiner

| (T) 10 µm | Mag = 1.00 K X | EHT = 15.00 kV | Signal A = SE2 | Time = Hr:Min:Sec |
| | WD = 9.1 mm | I Probe = 2.0 nA | Scan Speed = 6 | Date: D:M:Y |

METHOD OF CARBON MINERALIZATION

BACKGROUND

Technical Field

The present disclosure is directed towards a method of carbon mineralization, and more particularly, a method of carbon mineralization to convert carbon dioxide into stable and valuable mineral products under controlled conditions.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

The growing concentration of atmospheric carbon dioxide ($CO_2$) continues to raise serious international concern due to its role in global warming, ocean acidification, and ecosystem disruption. Various carbon capture, utilization, and sequestration (CCUS) technologies have been investigated to mitigate $CO_2$ emissions; however, each approach presents considerable limitations.

Conventional geological storage of $CO_2$, though widely studied, faces challenges related to high costs, limited availability of suitable storage reservoirs, long-term monitoring requirements, and risks of leakage or wellbore deterioration. Similarly, mineral carbonation involving naturally occurring silicate rocks such as olivine and serpentine is hindered by sluggish reaction kinetics, the need for energy-intensive pretreatments, and the requirement for large amounts of chemical additives to accelerate carbonation.

Produced water (PW) has been proposed as an alternative medium for $CO_2$ mineralization, owing to its naturally high concentrations of calcium and magnesium ions. While promising, PW-based carbonation also suffers from several drawbacks. The elevated ionic strength of PW can inhibit carbonate precipitation and reduce nucleation rates, while the inherently slow dissolution and reaction kinetics limit overall efficiency. Moreover, the variability in PW composition across different sources makes process improvement complex and site-specific.

Attempts to accelerate $CO_2$ mineralization using chemical additives, pH modifiers, or surfactants have shown potential, but these methods still encounter challenges. Surfactant-assisted carbonation studies have been limited primarily to a narrow set of amine-based surfactants, and their effectiveness in PW or similar high-salinity environments remains poorly understood. Additionally, adjustment of surfactant concentration to balance improved $CO_2$ solubility, particle stabilization, and process cost-effectiveness is still in need of improvement.

Despite extensive research, existing mineral carbonation techniques continue to be constrained by slow kinetics, incomplete carbonation, high operational costs, and limited understanding of additive effects on product mineralogy and stability. These limitations highlight the need for further investigation into strategies that can overcome the inefficiencies associated with PW-based $CO_2$ mineralization.

Accordingly, one object of the present disclosure is to provide a method of carbon mineralization that may circumvent the above specified drawbacks and limitations of the materials and methods known in the art.

SUMMARY

In an exemplary embodiment, a method of carbon mineralization is described. The method includes exposing a solution including a plurality of metal salts and a surfactant to carbon dioxide at a pressure in a range from 300 to 700 pounds per square inch (PSI) to form a carbonated solution. The method further includes adding a base to the carbonated solution until the pH is above 10 to form a reaction mixture and followed by reacting the reaction mixture to form a mineral precipitate. The carbon dioxide reacts with the metal salts to form the mineral precipitates. The surfactant includes a tertiary amine including one alkyl group and two ethoxylate groups including two or more ethoxy units. The mineral precipitates include calcite in a range from 30 to 70 weight percent (wt. %), portlandite in a range from 1 to 40 wt. %, brucite in a range from 15 to 35 wt. %, and halite in a range from 3 to 20 wt. %, each based on the total weight of mineral precipitates. The mineral precipitates are in the form of particles having an average size in a range from 1 to 75 μm.

In some embodiments, the mineral precipitates include calcite in a range from 35 to 65 wt. %, portlandite in a range from 3 to 35 wt. %, brucite in a range from 20 to 30 wt. %, and halite in a range from 5 to 15 wt. %, each based on the total weight of mineral precipitates.

In some embodiments, the mineral precipitates include calcite in a range from 39 to 60 wt. %, portlandite in a range from 5 to 30 wt. %, brucite in a range from 23 to 27 wt. %, and halite in a range from 6 to 13 wt. %, each based on the total weight of mineral precipitates.

In some embodiments, the mineral precipitates are in the form of particles having an average size in a range from 2 to 50 μm.

In some embodiments, the mineral precipitates are in the form of particles having an average size in a range from 3 to 10 μm.

In some embodiments, the reaction mixture is reacted at 20 to 40° C. for 12 to 36 hours to form the mineral precipitates.

In some embodiments, the exposing to carbon dioxide is performed at a pressure in a range from 400 to 600 PSI at 20 to 40° C. for 15 minutes to 3 hours to form the carbonated solution.

In some embodiments, the exposing is performed in a mixing reactor operating at 300 to 700 revolutions per minute (RPM) and a base is sodium hydroxide.

In some embodiments, the solution includes the surfactant in a range from 0.01 to 10.0 weight percent (wt. %), based on the total weight of the solution.

In some embodiments, the solution includes the surfactant in a range from 0.01 to 5 weight percent (wt. %), based on the total weight of the solution.

In some embodiments, the solution includes the surfactant in a range from 0.01 to 1.0 weight percent (wt. %), based on the total weight of the solution.

In some embodiments, the solution includes NaCl in a range from 30,000 to 70,000 parts per million (ppm), $MgCl_2 \cdot 6H_2O$ in a range from 6,000 to 11,000 ppm, $CaCl_2 \cdot 2H_2O$ in a range from 16,000 to 22,000 ppm, and $Na_2SO_4$ in a range from 500 to 2,000 ppm.

In some embodiments, the solution includes NaCl in a range from 40,000 to 60,000 ppm, $MgCl_2 \cdot 6H_2O$ in a range from 7,000 to 10,000 ppm, $CaCl_2 \cdot 2H_2O$ in a range from 17,000 to 21,000 ppm, and $Na_2SO_4$ in a range from 750 to 1,750 ppm.

In some embodiments, the solution includes NaCl in a range from 50,000 to 57,000 ppm, $MgCl_2 \cdot 6H_2O$ in a range from 8,000 to 9,000 ppm, $CaCl_2 \cdot 2H_2O$ in a range from 18,000 to 20,000 ppm, and $Na_2SO_4$ in a range from 1,000 to 1,500 ppm.

In some embodiments, the mineral precipitates have a zeta potential in a range from −5 to 25 millivolts (mV).

In some embodiments, the mineral precipitates have a zeta potential in a range from −3 to 20 mV.

In some embodiments, the mineral precipitates have a zeta potential in a range from −1 to 15 mV.

In some embodiments, the concentration of mineral precipitates formed is in a range from 5 to 15 grams per liter (g/L).

In some embodiments, the concentration of mineral precipitates formed is in a range from 7 to 13 g/L.

In some embodiments, the solution includes the surfactant at a concentration of 1.0 wt. 15%, based on the total weight of the solution, and the mineral precipitates are in the shape of particles having at least one of a flower-like and a rhombohedral morphology including aggregates of at least one of globular and cauliflower-like particles.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
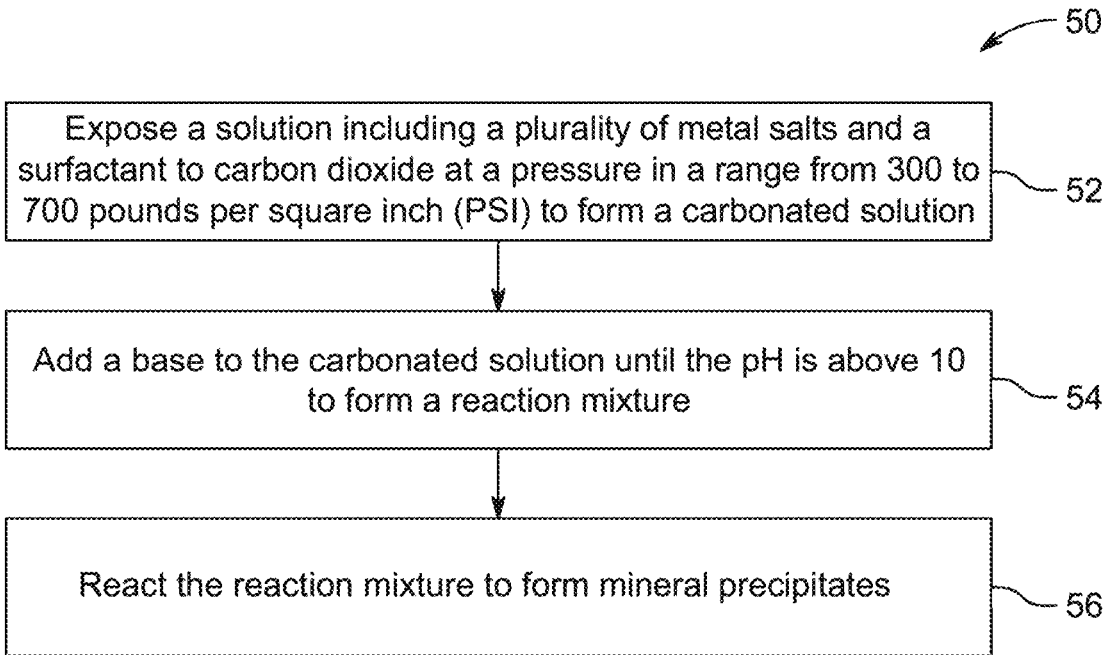
FIG. 1 is a flow chart of a method of carbon mineralization, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'carbon mineralization' refers to a process in which carbon dioxide ($CO_2$) is converted into stable, solid carbonate minerals through chemical reactions with dissolved metal ions.

As used herein, the term 'surfactant' refers to a surface-active agent that reduces interfacial tension between different phases and can facilitate $CO_2$ capture, mineral precipitation, and particle stabilization.

As used herein, the term 'zeta potential' refers to a measure of the electrical potential at the slipping plane of a particle in suspension, which indicates the stability and surface charge characteristics of colloidal dispersions.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

Aspects of this disclosure are directed to a sustainable method of $CO_2$ sequestration in produced water using the nonionic surfactant Ethomeen® C/15 to enhance mineralization, control phase composition, and tailor the physicochemical properties of the resulting mineral products. In the context of this present disclosure, Ethomeen® C/15 is a tertiary amine ethoxylate based on a primary coco amine which includes one alkyl group and two ethoxylate groups bonded to the nitrogen atom to form the tertiary amine, each ethoxylate group having two or more ethoxy units. The Ethomeen® C/15 surfactant may be referred to herein as "C/15", "C/15 surfactant", or "the surfactant". In one or more embodiments, the alkyl group is 1 to 30, preferably 3 to 25, preferably 5 to 20, preferably 7 to 16, preferably 12 carbons long. In one or more embodiments, the Ethomeen® C/15 has an average of 1 to 20, preferably 2 to 15, preferably 3 to 10, preferably 4 to 8, preferably 5 total ethoxy units. In a preferred embodiment, the alkyl group is 12 carbons long and the Ethomeen® C/15 has an average of 5 total ethoxy units.

FIG. 1 illustrates a schematic flow chart of a method 50 of carbon mineralization. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes exposing a solution including a plurality of metal salts and a surfactant to carbon dioxide at a pressure in a range from 300 to 700 pounds per square inch (PSI) to form a carbonated solution. In a preferred embodiment, the carbon dioxide reacts with the metal salts to form the mineral precipitates.

In some embodiments, the exposing to carbon dioxide is performed at a pressure in a range from 100 to 1000 PSI, preferably 300 to 700 PSI, preferably 400 to 600 PSI, preferably 420 to 580 PSI, preferably 440 to 560 PSI, preferably 460 to 540 PSI, preferably 480 to 520 PSI, preferably 500 PSI at 10 to 60° C., preferably 20 to 40° C., preferably 21 to 35° C., preferably 22 to 30° C., preferably 23 to 28° C., preferably 24 to 26° C., preferably 25° C. for 5 minutes to 5 hours, preferably 15 minutes to 3 hours, preferably 30 minutes to 2 hours, preferably 45 minutes to 1.5 hours, preferably 50 minutes hour to 1.25 hours, preferably 1 hour to form the carbonated solution. In a preferred embodiment, exposure to carbon dioxide is performed at a pressure of 500 PSI at 25° C. for 1 hour to form the carbonated solution.

In some embodiments, the exposing is performed in a mixing reactor operating at 100 to 1000 revolutions per minute (RPM), preferably 300 to 700 RPM, preferably 320 to 680 RPM, preferably 340 to 660 RPM, preferably 360 to 640 RPM, preferably 380 to 620 RPM, preferably 400 to 600 RPM, preferably 420 to 580 RPM, preferably 440 to 560 RPM, preferably 460 to 540 RPM, preferably 480 to 520 RPM, preferably 500 RPM. In a preferred embodiment, the exposing is performed in a mixing reactor operating at 500 RPM.

In some embodiments, the surfactant may include, but is not limited to, Tween 20, Tween 40, Tween 60, Tween 80, Span 20, Span 40, Span 60, Span 80, Brij 30, Brij 35, Brij 52, Brij 58, Triton X-100, Triton X-114, Triton X-405, CTAB, DTAB, OTAB, SDS, SDBS, sodium lauryl sulfate, sodium laureth sulfate, cocamidopropyl betaine, lecithin, polysorbate 85, poloxamer 188, poloxamer 407, sodium cholate, sodium deoxycholate, lauryldimethylamine oxide, dodecyl maltoside, and combinations thereof. In a preferred embodiment, the surfactant includes a tertiary amine including one alkyl group and two ethoxylate groups, with each ethoxylate group including two or more ethoxy units. In a preferred embodiment, the surfactant is Ethomeen® C/15.

In some embodiments, the solution includes the surfactant in a range from 0.005 to 20.0 weight percent (wt. %), preferably 0.01 to 10.0 wt. %, preferably 0.1 to 10.0 wt. %, preferably 0.5 to 10.0 wt. %, preferably 1 to 10.0 wt. %, preferably 2 to 10.0 wt. %, preferably 3 to 10.0 wt. %, preferably 4 to 10.0 wt. %, preferably 5 to 10.0 wt. %, preferably 6 to 10.0 wt. %, preferably 7 to 10.0 wt. %, preferably 8 to 10.0 wt. %, preferably 9 to 10.0 wt. %, preferably 0.01 to 5 wt. %, preferably 0.1 to 5 wt. %, preferably 0.5 to 5 wt. %, preferably 1 to 5 wt. %, preferably 2 to 5 wt. %, preferably 3 to 5 wt. %, preferably 4 to 5 wt. %, preferably 0.01 to 1.0 wt. %, preferably 0.1 to 1.0 wt. %, preferably 0.2 to 1.0 wt. %, preferably 0.3 to 1.0 wt. %, preferably 0.4 to 1.0 wt. %, preferably 0.5 to 1.0 wt. %, preferably 0.6 to 1.0 wt. %, preferably 0.7 to 1.0 wt. %, preferably 0.8 to 1.0 wt. %, preferably 0.9 to 1.0 wt. % based on the total weight of the solution. In a preferred embodiment, the solution includes the surfactant in a concentration of 0.01, 0.1 and 1 wt. %, based on the total weight of the solution.

In some embodiments, the solution includes NaCl in a range from 10,000 to 100,000 parts per million (ppm), preferably 30,000 to 70,000 ppm, preferably 40,000 to 60,000 ppm, preferably 50,000 to 57,000 ppm, preferably 53,000 to 57,000 ppm. In a preferred embodiment, the solution includes NaCl at a concentration of 53,670 ppm.

In some embodiments, the solution includes $MgCl_2 \cdot 6H_2O$ in a range from 2,000 to 20,000 ppm, preferably 6,000 to 11,000 ppm, preferably 7,000 to 10,000 ppm, preferably 8,000 to 9,000 ppm, preferably 8,500 to 9,000 ppm. In a preferred embodiment, the solution includes $MgCl_2 \cdot 6H_2O$ at a concentration of 8510 ppm In some embodiments, the solution includes $CaCl_2 \cdot 2H_2O$ in a range from 10,000 to 32,000 ppm, preferably 16,000 to 22,000 ppm, preferably 17,000 to 21,000 ppm, preferably 18,000 to 20,000 ppm, preferably 19,000 to 20,000 ppm. In a preferred embodiment, the solution includes $CaCl_2 \cdot 2H_2O$ at a concentration of 18,810 ppm.

In some embodiments, the solution includes $Na_2SO_4$ in a range from 100 to 5,000 ppm, preferably 500 to 2,000 ppm, preferably 750 to 1,750 ppm, preferably 1,000 to 1,500 ppm, preferably 1,100 to 1,500 ppm, preferably 1,200 to 1,500 ppm, preferably 1,300 to 1,500 ppm. In a preferred embodiment, the solution includes $Na_2SO_4$ at a concentration of 1351 ppm.

At step 54, the method 50 includes adding a base to the carbonated solution until the pH is above 10 to form a reaction mixture. In some embodiments, the base may include, but is not limited to, potassium hydroxide, lithium hydroxide, calcium hydroxide, barium hydroxide, strontium hydroxide, magnesium hydroxide, ammonium hydroxide, sodium carbonate, potassium carbonate, lithium carbonate, calcium carbonate, barium carbonate, strontium carbonate, magnesium carbonate, sodium bicarbonate, potassium bicarbonate, lithium bicarbonate, calcium bicarbonate, ammonium carbonate, sodium oxide, potassium oxide, lithium oxide, calcium oxide, barium oxide, strontium oxide, magnesium oxide, sodium phosphate, potassium phosphate, lithium phosphate, calcium phosphate, and combinations thereof. In a preferred embodiment, the base is sodium hydroxide.

In some embodiments, the concentration of NaOH may vary from 0.005 to 20.0 weight percent (wt. %), preferably 0.01 to 10.0 wt. %, preferably 0.1 to 8 wt. %, preferably 0.5 to 5 wt. %, preferably 0.75 to 3 wt. %, preferably 1.0 to 2 wt. %. In a preferred embodiment, the concentration of NaOH is 1.2 wt. %.

At step 56, the method 50 includes reacting the reaction mixture to form mineral precipitates. In some embodiments, the reaction mixture is reacted at 10 to 60° C., preferably 20 to 40° C., preferably 21 to 35° C., preferably 22 to 30° C., preferably 23 to 28° C., preferably 24 to 26° C., preferably 25° C. for 12 to 36 hours, preferably 14 to 34 hours, preferably 16 to 32 hours, preferably 18 to 30 hours, preferably 20 to 28 hours, preferably 22 to 26 hours, to form the mineral precipitates. In a preferred embodiment, the reaction mixture is reacted 25° C. for 24 hours.

In some embodiments, concentration of mineral precipitates formed is in a range from 1 to 35 grams per liter (g/L), preferably 5 to 15 g/L, preferably 7 to 13 g/L, preferably 9 to 12 g/L, preferably 10 to 12 g/L, preferably 10.5 to 11.5 g/L. In a preferred embodiment, the concentration of mineral precipitates formed is about 11 g/L.

In some embodiments, the mineral precipitates include calcite in a range from 20 to 80 weight percent (wt. %), preferably 30 to 70 wt. %, preferably 35 to 65 wt. %, preferably 39 to 60 wt. %, preferably 49 to 60 wt. %, based on the total weight of mineral precipitates. In a preferred embodiment, the mineral precipitates include calcite at a concentration of 54 wt. % based on the total weight of mineral precipitates.

In some embodiments, the mineral precipitates include portlandite in a range from 0.5 to 50 wt. %, preferably 1 to 40 wt. %, preferably 3 to 35 wt. %, preferably 5 to 30 wt. %, preferably 5 to 25 wt. %, preferably 155 to 20 wt. %, preferably 5 to 10 wt. %, based on the total weight of mineral precipitates. In a preferred embodiment, the mineral precipitates include portlandite at a concentration of 8 wt. % based on the total weight of mineral precipitates.

In some embodiments, the mineral precipitates include brucite in a range from 5 to 45 wt. %, preferably 15 to 35 wt. %, preferably 20 to 30 wt. %, preferably 23 to 27 wt. %, preferably 24 to 27 wt. %, preferably 25 to 27 wt. %, based on the total weight of mineral precipitates. In a preferred embodiment, the mineral precipitates include brucite at a concentration of 26 wt. % based on the total weight of mineral precipitates.

In some embodiments, the mineral precipitates include halite in a range from 1 to 30 wt. %, preferably 3 to 20 wt. %, preferably 5 to 15 wt. %, preferably 6 to 13 wt. %, preferably 8 to 13 wt. %, preferably 10 to 13 wt. %, based on the total weight of mineral precipitates. In a preferred embodiment, the mineral precipitates include halite at a concentration of 12 wt. % based on the total weight of mineral precipitates.

In some embodiments, the mineral precipitates are in the form of crystals, crystallites, grains, agglomerates, aggregates, clusters, nodules, spherulites, flakes, powders, films, coatings, scales, deposits, concretions, dendrites, whiskers, rods, plates, prisms, needles, fibers, shells, granules, pellets, blocks, chunks, lumps, layers, sheets, and coatings. In a preferred embodiment, the mineral precipitates are in the form of particles.

In some embodiments, the mineral precipitates are in the form of particles having an average size in a range from 0.5 to 150 µm, preferably 1 to 75 µm, preferably 10 to 75 µm, preferably 20 to 75 µm, preferably 30 to 75 µm, preferably 40 to 75 µm, preferably 50 to 75 µm, preferably 60 to 75 µm, preferably 70 to 75 µm, preferably 2 to 50 µm, preferably 10 to 50 µm, preferably 20 to 50 µm, preferably 30 to 50 µm, preferably 40 to 50 µm, preferably 3 to 10 µm, preferably 3.25 to 8 µm, preferably 3.5 to 6 µm. In a preferred embodiment, the mineral precipitates are in the form of particles having an average size of 4.01 µm.

In some embodiments, the mineral precipitates have a zeta potential in a range from −10 to 35 millivolts (mV), preferably −5 to 25 millivolts (mV), preferably −3 to 20 mV, preferably −1 to 15 mV. In a preferred embodiment, the mineral precipitates have a zeta potential of 13.4 mV. In another preferred embodiment, the mineral precipitates have a zeta potential of 5.5 mV. In yet another preferred embodiment, the mineral precipitates have a zeta potential of −0.9 mV.

In one or more embodiments, the solution includes the surfactant at a concentration of 1.0 wt. %, based on the total weight of the solution. In such embodiments, the mineral precipitates are in the shape of particles having at least one of a flower-like and a rhombohedral morphology including aggregates of at least one of globular and cauliflower-like particles. In a preferred embodiment, the solution includes the surfactant at a concentration of 1.0 wt. %, based on the total weight of the solution, and the mineral precipitates are in the shape of particles having at least one of a rose-like and a rhombohedral morphology including aggregates of at least one of globular and cauliflower-like particles. In one or more embodiments, the surfactant concentration influences secondary particle cohesion and crystallinity, leading to the formation of higher order aggregate particles.

The following examples are provided solely for illustration and are not to be construed as limitations of the present disclosure, as many variations thereof are possible without departing from the spirit and scope of the present disclosure.

EXAMPLES

The following examples demonstrate a method of carbon mineralization. The examples are provided solely for illustration and are not to be construed as limitations of the present disclosure, as many variations thereof are possible without departing from the spirit and scope of the present disclosure.

Example 1: Materials and Methods

Figure 2:
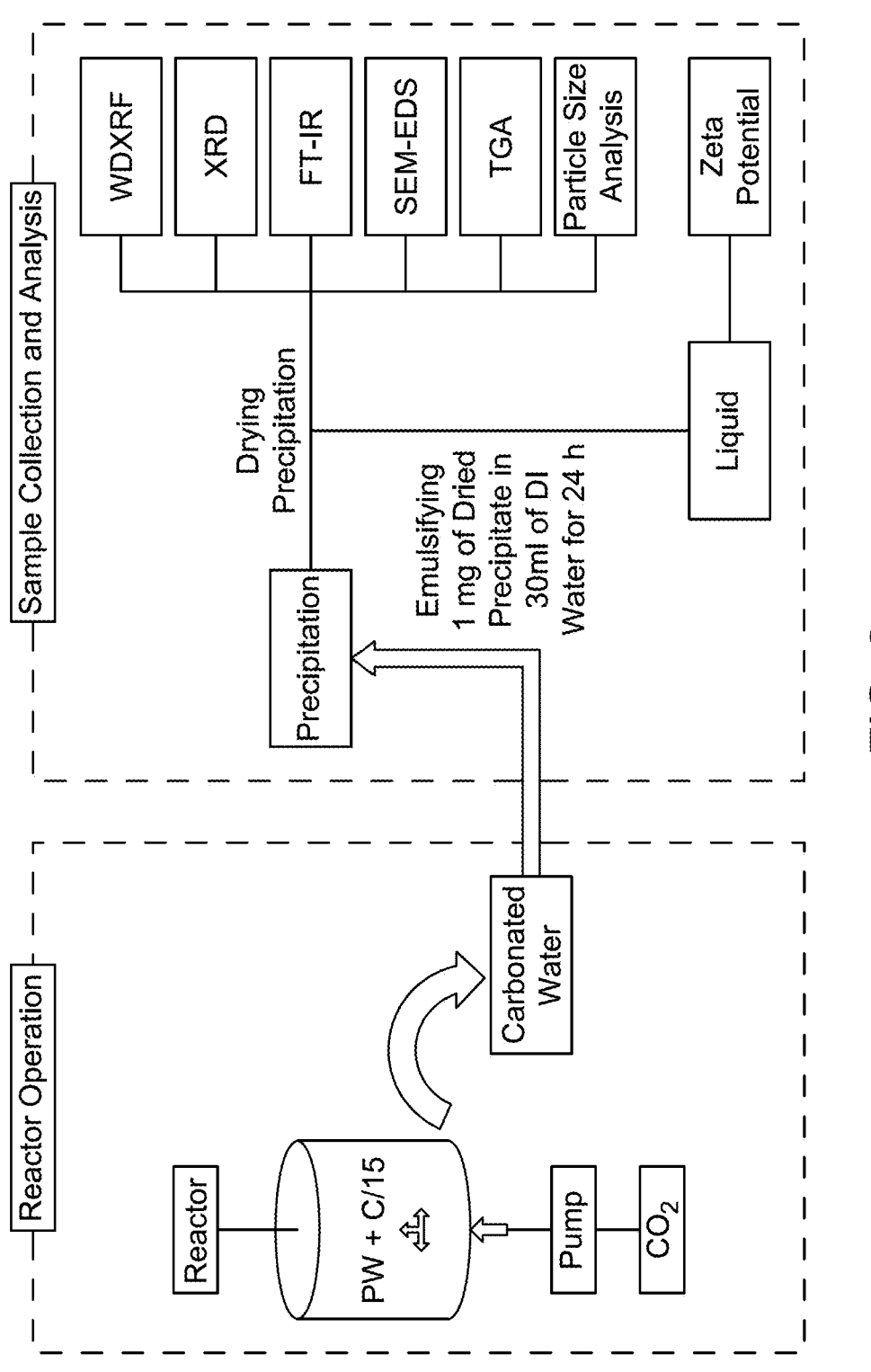
FIG. 2 is a flow diagram of the entire process of carbon mineralization, including the reactor operation and different characterization analyses, according to certain embodiments.
Figure 3A:
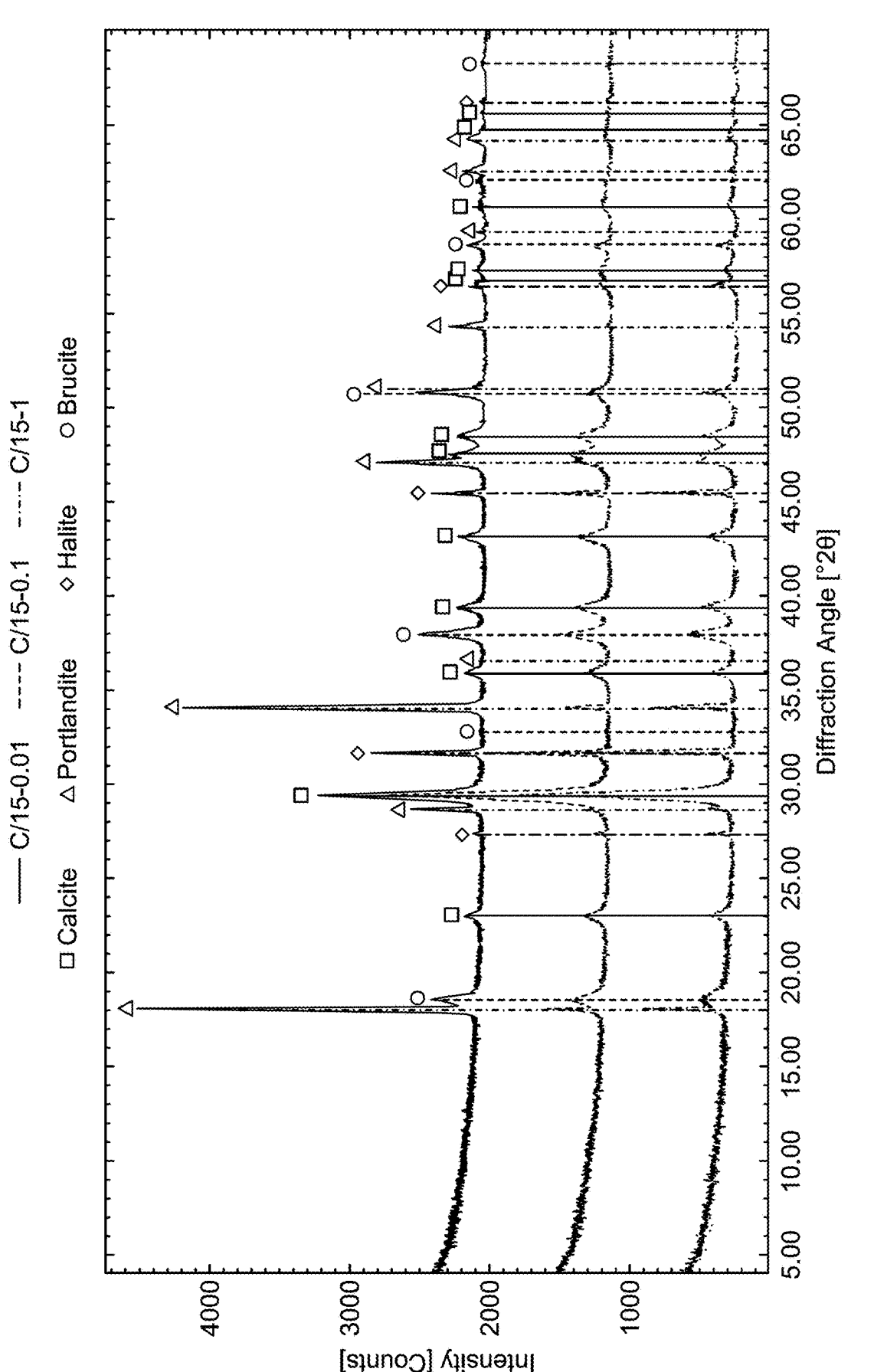
FIG. 3A is an X-ray diffraction (XRD) pattern of the three precipitated samples at the three different concentrations of C/15, according to certain embodiments.
Figures 3B, 3C, 3D:
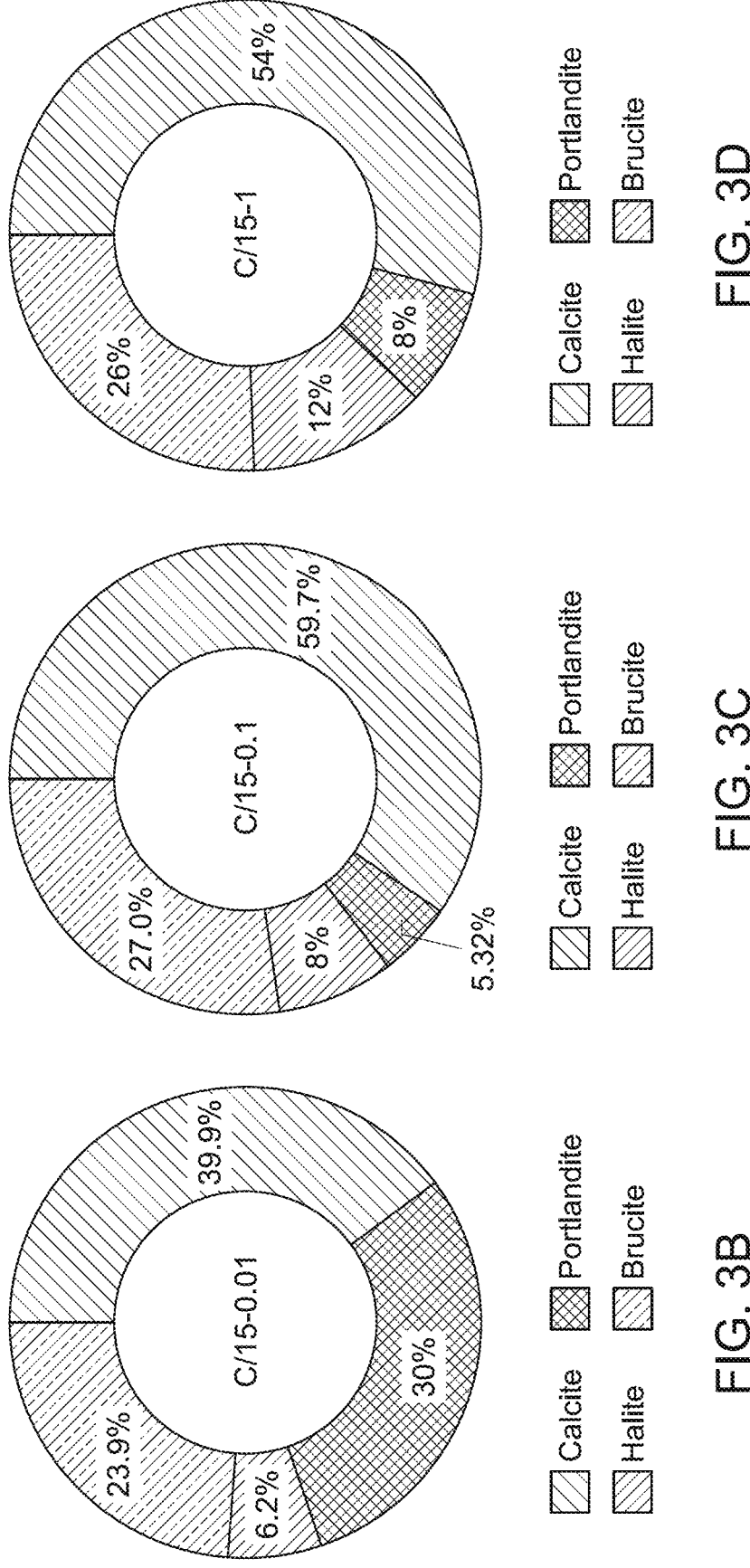
FIG. 3B is a quantitative phase composition (wt. %) at C/15-0.01% surfactant concentrations, according to certain embodiments.
FIG. 3C is a quantitative phase composition (wt. %) at C/15-0.1% surfactant concentrations, according to certain embodiments.
FIG. 3D is a quantitative phase composition (wt. %) at C/15-1% surfactant concentrations, according to certain embodiments.

All materials and methods used in this present disclosure, were prepared and analyzed at the facilities of Center of Integrative Petroleum Research (CIPR), College of Petroleum Engineering and Geosciences (CPG) at King Fahd University of Petroleum and Minerals (KFUPM), Saudi Arabia. The flow diagram that demonstrates the entire process including the following materials and characterization techniques of the three precipitated samples at three different concentrations of C/15 and their fluids is shown in FIG. 2.

Material and Sample Preparation

This present disclosure uses high-purity $CO_2$ gas (99.99%), oil field produced water, and Ethomeen® C/15. Ethomeen® C/15 is a nonionic surfactant selected for its $CO_2$-capturing capability, attributed to the presence of an amine group in its chemical structure. Produced water was synthesized by dissolving the salts listed in Table 1 into deionized (DI) water.

TABLE 1

| Synthetic-produced water salt composition. | |
| --- | --- |
| Salt | Concentration (PPM) |
| NaCl | 53,670 |
| $MgCl_2 \cdot 6H_2O$ | 8510 |
| $CaCl_2 \cdot 2H_2O$ | 18,810 |
| $Na_2SO_4$ | 1351 |
| Total dissolved salts (TDS) | 82,341 |

Three separate solutions were prepared by dissolving Ethomeen® C/15 at three varying concentrations (0.01%, 0.1%, and 1% by weight) in the prepared PW to evaluate its effect on $CO_2$ solubility, mineralization kinetics, and the nature of the precipitated minerals. Each solution was exposed to $CO_2$ at 25° C. and 500 psi in a mixing reactor (Parr 4848 model), operating at 500 RPM for one hour to reach equilibrium. Subsequently, a sample from each carbonated (CPW) solution (PW+C15+$CO_2$) was analyzed using an Analytik Jena multi N/C 3100 analyzer to determine the total inorganic carbon (TIC). The TIC values were then converted to $CO_2$ uptake by multiplying by a factor of 3.7, as presented in Table 2.

TABLE 2

| CO2 absorption capacity of the tested solutions. | | | | |
| --- | --- | --- | --- | --- |
| Sample ID | pH Before $CO_2$ | pH After $CO_2$ | TIC (mg/l) | $CO_2$ uptake (mg/l) |
| wt. % PW + 0.01 wt. % C15 + $CO_2$ | 7.30 | 4.12 | 225 | 832 |
| wt. % PW + 0.1 wt. % C15 + $CO_2$ | 8.96 | 4.14 | 356 | 1317 |
| wt. % PW + 1.0 wt. % C15 + $CO_2$ | 9.62 | 5.45 | 802 | 2967 |

Subsequently, 1.2 wt. % of NaOH was gradually added to the CPW to raise the pH above 10 (Table 3). Once the target pH was achieved, the solution was left to react for 24 hours to provide complete interaction. The resulting precipitates were then collected and dried at 100° C. for 24 hours. The dried samples were stored in desiccators for subsequent analysis.

TABLE 3

| Weight of precipitates from the tested solutions. | | |
| --- | --- | --- |
| Sample ID | pH | Weight of precipitate (g/l) |
| PW + 0.01 wt. % C15 + $CO_2$ + NaOH | 12.37 | 9.4 |
| PW + 0.1 wt. % C15 + $CO_2$ + NaOH | 12.41 | 10 |
| PW + 1 wt. % C15 + $CO_2$ + NaOH | 12.51 | 11 |

Example 2: Characterization Techniques of the Materials

Wavelength Dispersive X-ray Fluorescence (WDXRF)

Both qualitative and quantitative elemental analyses of the three precipitated samples (C/15 at 0.01 wt. %, 0.1 wt. %, and 1 wt. %) were carried out using a Zetium WD-XRF spectrometer (X-ray Generating: 50 KV and 40 mA). Fused beads of 1 gm of the sample with 10 gm of Li-bearing agent (Lithium Tetraborate with Lithium Metaborate and Lithium iodide (Fused and Anhydrous)) were used before analysis. Major elements were focused on to evaluate the geochemical composition of the three precipitates.

X-Ray Diffraction (XRD)

Phase identification of the three precipitated samples was investigated using an X-ray diffractometer (XRD, Panalytical Empyrean diffractometer, Empyrean model) that operated under standard conditions to characterize the mineral composition of the samples. The samples were crushed and pulverized to grain sizes around 1 m using agate mortar. The investigation was run with a Cu anode (45 kV, 40 mA) and Kα1 radiation (λ=1.54060 Å). The scan was carried out over a 2θ range of 4° to 70° with a step size of 0.0130° 2θ and a scan step time of 8.67 seconds using a Bragg-Brentano configuration. The system was calibrated to provide a Kα2/Kα1 ratio of 0.50000 for accurate diffraction peak analysis. XRD data were analyzed using the Xpert HighScore software and matched against the ICDD® 2023 (International Centre for Diffraction Data) database to identify crystalline phases. The quantitative analysis was performed based on the Rietveld Refinement method.

Fourier Transform Infrared Spectroscopy (FT-IR)

Bonding structures and functional groups (to aid in the identification of minerals) in the three precipitated samples were identified by FT-IR spectra that were recorded using a Fourier Transform Infrared Spectrometer (Bruker Invenio S, Platinum ATR), equipped with a diamond ATR crystal plate. Spectra were measured in far- and mid-infrared wavelength range (FIR-MIR) in absorbance mode, ranging from 4000 to 400 cm-1 at a spectral resolution of 0.4 cm-1, with each sample's spectrum averaged over 64 scans per sample. Diagnostic vibrational absorption features, or bands that correspond to carbonate ($CO_3^-$), hydroxyl ($OH^-$), and other functional groups can be identified.

Scanning Electron Microscopy with Energy Dispersive X-Ray Spectroscopy (SEM-EDS)

The surface morphology (surface structure characteristics) of the precipitated materials was examined using Scanning Electron Microscopy (Zeiss Gemini-SEM 450). Double-sided adhesive tape were used to mount the three samples on the specimen stubs, then the samples' surface was sputter-coated with gold-palladium (Au—Pd) to enhance the conductivity. SEM-EDS analysis was conducted to determine the elemental composition and distribution within samples. The operating parameters were set to 15 kV accelerating voltage, 2.0 nA probe current, and 9.0 mm working distance.

Thermogravimetric Analysis (TGA)

TGA was performed using a PerkinElmer Instrument TG-IR-GCMS Interface TL8000 thermogravimetric analyzer. Samples were dried by holding isothermally at 30° C. for 1 min before heating from room temperature (30° C.) to 1000° C. at a heating rate of 10° C./min under a nitrogen atmosphere. The starting sample mass was around 8.8 mg. The weight loss data was used to assess thermal stability and quantify carbonate content (which is previously identified by complementary techniques like XRD and FTIR) based on decomposition temperatures.

Particle Size Analysis

The size distribution of the mineral particles in each sample was measured under identical conditions using a HELOS KR laser diffraction system with WINDOX 5 software. Samples were dispersed in Deionized (DI) water with ultrasonic agitation to prevent agglomeration before measurement.

Zeta Potential Analysis (With DI water)

A solid surface in contact with an aqueous solution forms an interfacial charge, which rearranges the local free ions in the solution to create a narrow zone of nonzero net charge density at the interface. The electrical double layer (EDL) is the solid-liquid interface charges and the balancing liquid counterions. Electrostatic attractions keep compact layer counterions immobile and the counterions out the compact layer can move. This is the diffuse EDL layer. The zeta potential ($\zeta$) is the electrostatic potential at the compact-diffuse layer boundary. The zeta potential determines usefulness in several applications, such as biomedical polymer characterization, electrokinetic circulation of particles or blood cells, membrane efficiency, and microfluidics. Comprehending the unique colloidal and interfacial interactions related to these applications requires an understanding of the $\zeta$-potential. Zeta potential ($\zeta$) analyses are useful for comprehending the electrostatic repulsions in formulations. The zeta potential's value is affected by several parameters, including the natural characteristics of the solution, ionic strength, dispersion concentration, pH, density, and formulation techniques, such as ultrasonication.

Zeta potential (ZP) analysis was run using the phase analysis light scattering method with the LiteSizer 500 Particle Analyzer from Aton Paar to evaluate the surface charge and colloidal stability of the mineral particles. The procedure involved loading a specific cell with the sample then placing it in the analyzer. An applied electric field induced the migration of colloidal particles in the fluid, based upon the charge at their slip plane (a process called electrophoresis). ZP was computed utilizing the Smoluchowski equation, based on the observed electrophoretic mobility, elucidating the electrostatic interactions among particles and their influence on changes in wettability. ZP was measured for the solutions formed from three samples powders (0.01%, 0.1%, 1 wt. % of C15). 1 gm of each powder was added to 30 ml of DI (Deionized) water (to eliminate the influence of ionic strength on the measurements), then they were thoroughly agitated and left for 24 h to guarantee better particle dispersion. After that, the samples were centrifuged at 3000 RPM for 5 min to enable stable dispersion formation, then 1 ml of the supernatant was added to a tiny glass vessel used in ZP analyzer. Each sample was measured twice to provide for reliability of the results.

Wavelength Dispersive X-Ray Fluorescence (WDXRF)

The chemical composition of the three samples is summarized in Table 4. The results show distinct compositional trends across the three samples. Calcium oxide (CaO) constituted the majority of the precipitates (72.81-76.15%). The highest CaO content was observed at the lowest surfactant concentration (0.01 wt. %). Magnesium oxide (MgO) represented the second largest portion (13.43-14.39%), peaking with 0.1 wt. % C/15. Sodium oxide ($Na_2O$) and chlorine (Cl) exhibited a marked increase at the highest surfactant concentration (1 wt. %) with rising to 6.18% and 6.45%, respectively. Sulfur trioxide ($SO_3$) remained low (<0.71%). Trace oxides ($Al_2O_3$, $Cr_2O_3$, CuO, $Fe_2O_3$, NiO, $P_2O_5$, $SiO_2$, and $TiO_2$) collectively accounted for <0.54% in all samples which indicate minimal formation of impurities and high mineralogical purity.

TABLE 4

| Oxide composition of three samples containing C/15 at 0.01%, 0.1%, and 1% by weight measured by WDXRF (units are wt. %). | | | | | | |
| --- | --- | --- | --- | --- | --- | --- |
| Sample | CaO | MgO | $Na_2O$ | Cl | $SO_3$ | Others |
| C/15-0.01 | 76.15 | 13.43 | 4.83 | 4.82 | 0.23 | 0.54 |
| C/15-0.1 | 75.67 | 14.39 | 4.32 | 4.63 | 0.71 | 0.29 |
| C/15-1.0 | 72.81 | 13.62 | 6.18 | 6.45 | 0.60 | 0.34 |

Others* - Oxides with concentrations less than 0.1% ($Al_2O_3$, $Cr_2O_3$, CuO, $Fe_2O_3$, NiO, and $P_2O_5$, $SiO_2$, and $TiO_2$).

XRD analysis revealed variations in mineral composition across the three samples (FIG. 3A-3D). The dominant phases identified were calcite ($CaCO_3$), portlandite ($Ca(OH)_2$), brucite ($Mg(OH)_2$), and halite (NaCl). Their relative abundances are strongly influenced by surfactant concentration. C/15-0.01 (FIG. 3B) shows Calcite (39.9%) and brucite (23.9%) constituted the majority, alongside substantial portlandite (30.03%) and halite (6.2%). C/15-0.1 (FIG. 3C) demonstrates Calcite content at 59.7%, with reduced portlandite (5.32%) and increased brucite (27.0%). Halite increased slightly to 8.0%. C/15-1 (FIG. 3D) exhibits Calcite decreased to 54.0%, while halite surged to 12.0%. Brucite (26.0%) and portlandite (8.06%) remained moderate. Calcite diffraction peaks dominated at angles consistent with its rhombohedral structure, while brucite exhibited characteristic layered hydroxide reflections. Halite signatures intensified at higher surfactant concentrations which correlates with NaCl retention.

Figure 4:
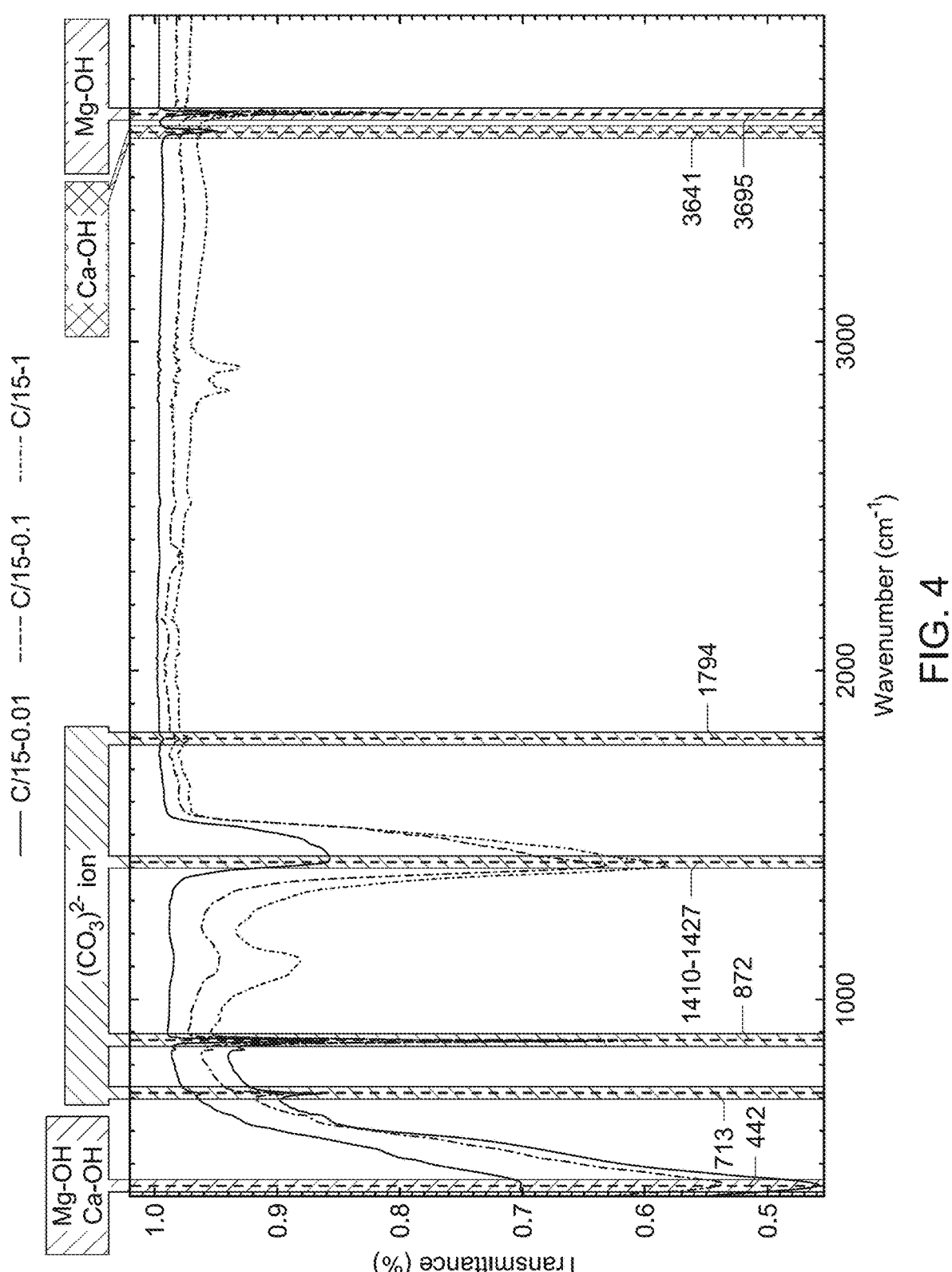
FIG. 4 is a Fourier transform infrared spectroscopy (FTIR) stacked spectra of the three precipitated samples at the three different concentrations of C/15, according to certain embodiments.

To further examine the chemical characteristics of the precipitates formed during $CO_2$ mineralization PW in the presence of the C/15 surfactant, Fourier Transform Infrared (FTIR) spectroscopy was conducted, as shown in FIG. 4. The spectra confirmed the presence of carbonate and hydroxide phases, indicating successful $CO_2$ mineralization across all surfactant concentrations (0.01, 0.1, and 1 wt. %). Characteristic carbonate ion $(CO_3{}^2{}_3{}^{2-})$ vibrations were observed, including a broad asymmetric stretching band $(v_3)$ at 1410-1427 $cm^{-1}$, a sharp out-of-plane bending peak $(v_2)$ at 872 $cm^{-1}$ unique to calcite, an in-plane bending band $(v_4)$ at 713 $cm^{-1}$ confirming calcite's rhombohedral structure, and a minor combination band at 1794 $cm^{-1}$ assigned to $v_1+v_4$ modes. Hydroxide-related features were also identified, with a Mg—OH stretching band at 3695 $cm^{-1}$ indicating brucite $(Mg(OH_2)_2)$ and a Ca—OH stretching band at 3641 $cm^{-1}$, indicating portlandite $(Ca(OH)_2)$. In addition, absorption features below 500 $cm^{-1-1}$, such as the band at 442 $cm^{-1}$, were attributed to Mg—O and Ca—O lattice vibrations, further supporting the presence of brucite and portlandite in the mineralized products.

Figure 5A:
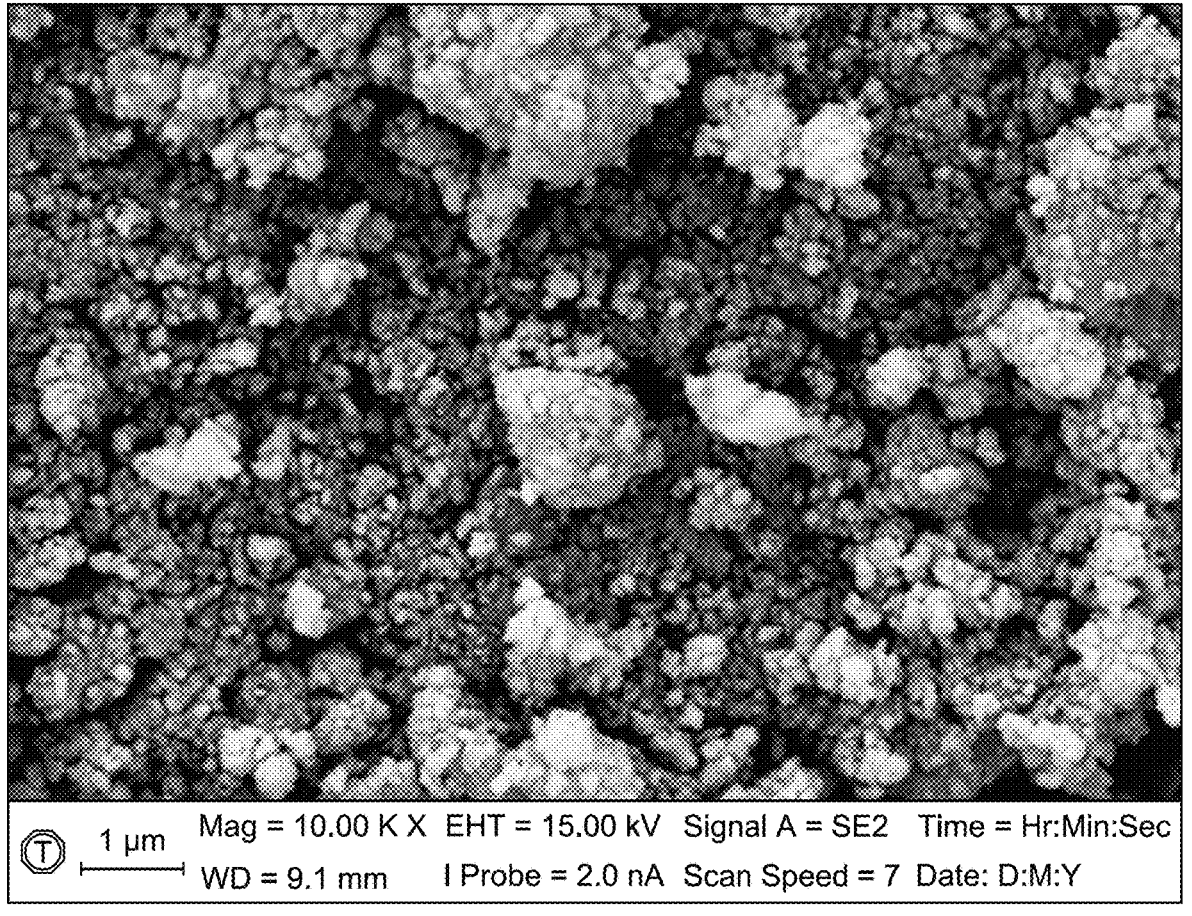
FIG. 5A is a scanning electron microscope (SEM) micrograph of precipitates under C/15-0.01 concentration at 1 μm magnification, according to certain embodiments.
Figure 5B:
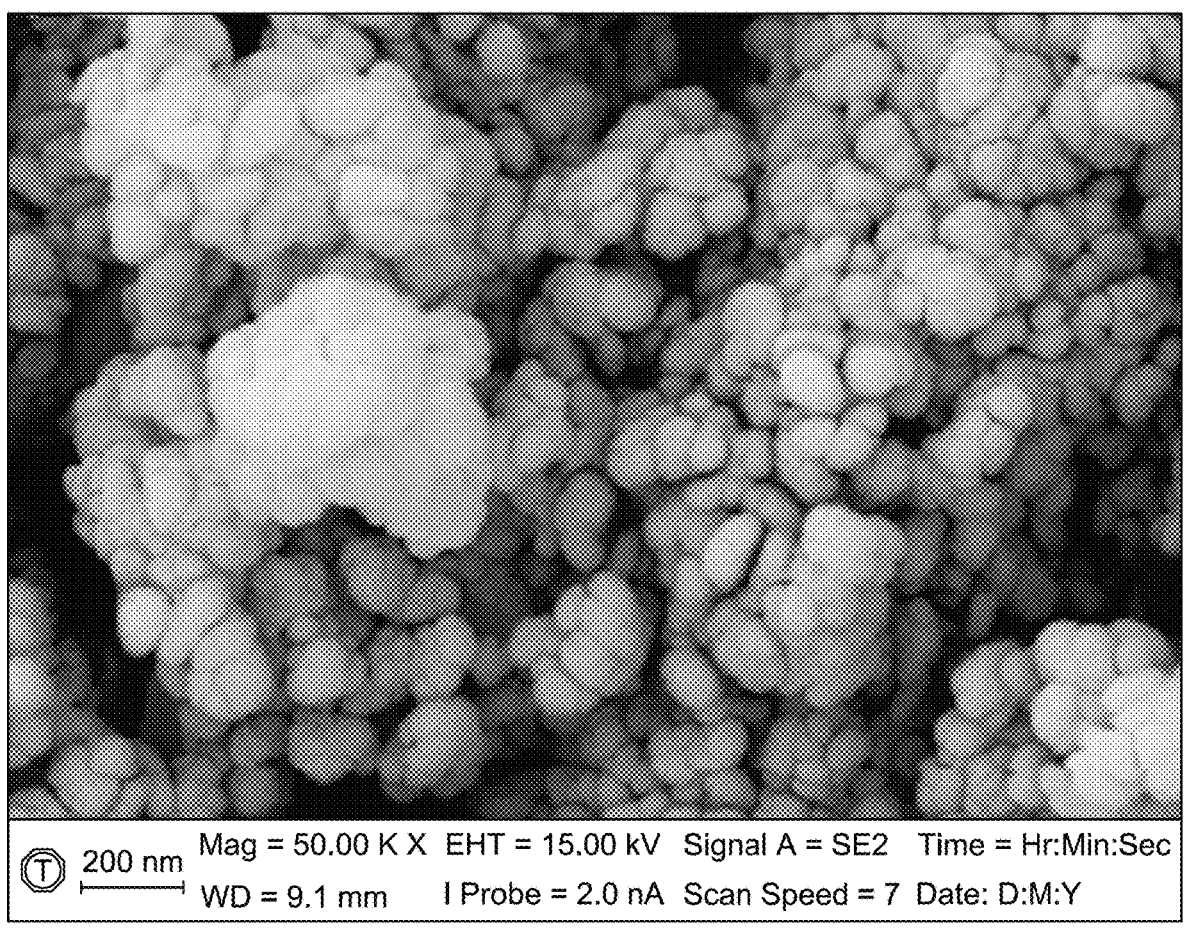
FIG. 5B is a SEM micrograph of precipitates under C/15-0.01 concentration at 200 nm magnification, according to certain embodiments.
Figure 5C:
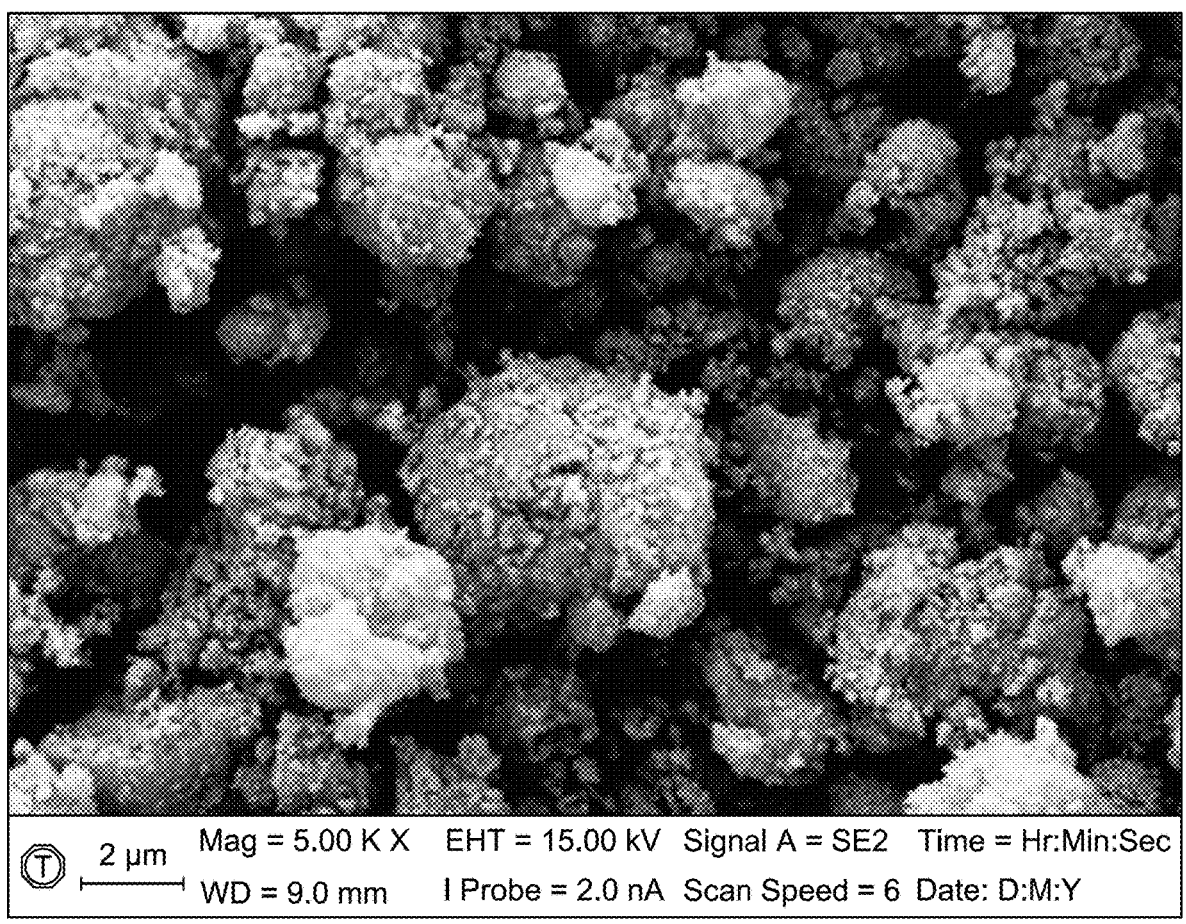
FIG. 5C is a SEM micrograph of precipitates under C/15-0.1 concentration at 2 μm magnification, according to certain embodiments.
Figure 5D:
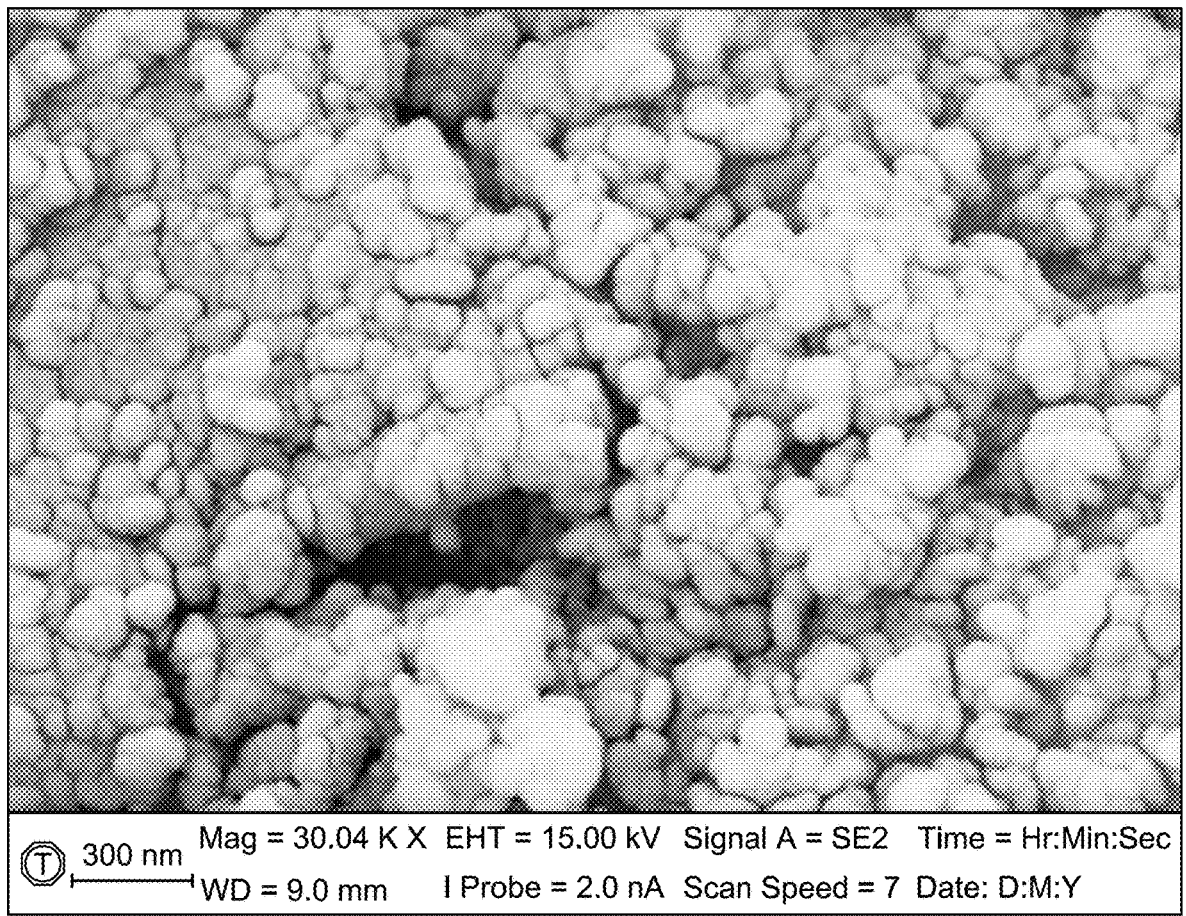
FIG. 5D is a SEM micrograph of precipitates under C/15-0.1 concentration at 300 nm magnification, according to certain embodiments.
Figure 5E:
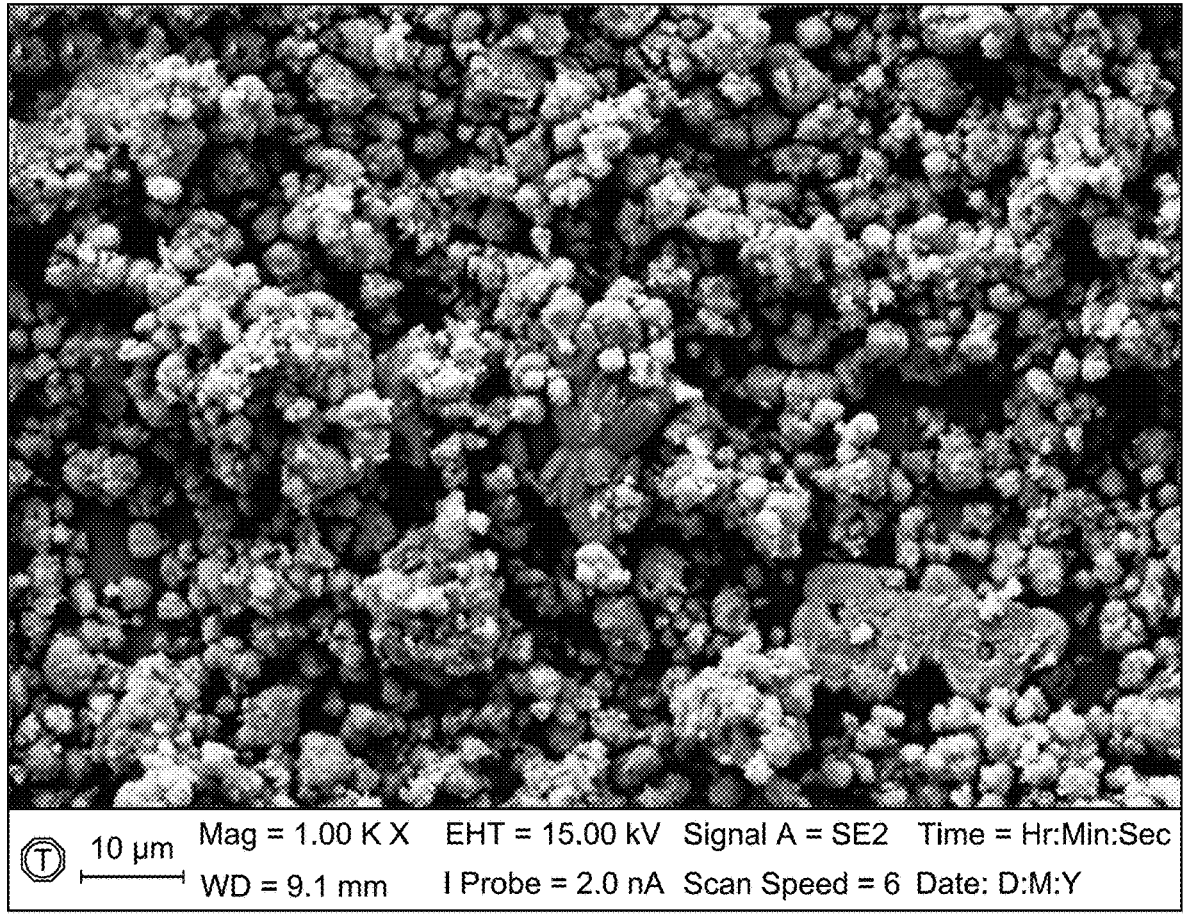
FIG. 5E is a SEM micrograph of precipitates under C/15-1 concentration at 10 μm magnification, according to certain embodiments.
Figure 5F:
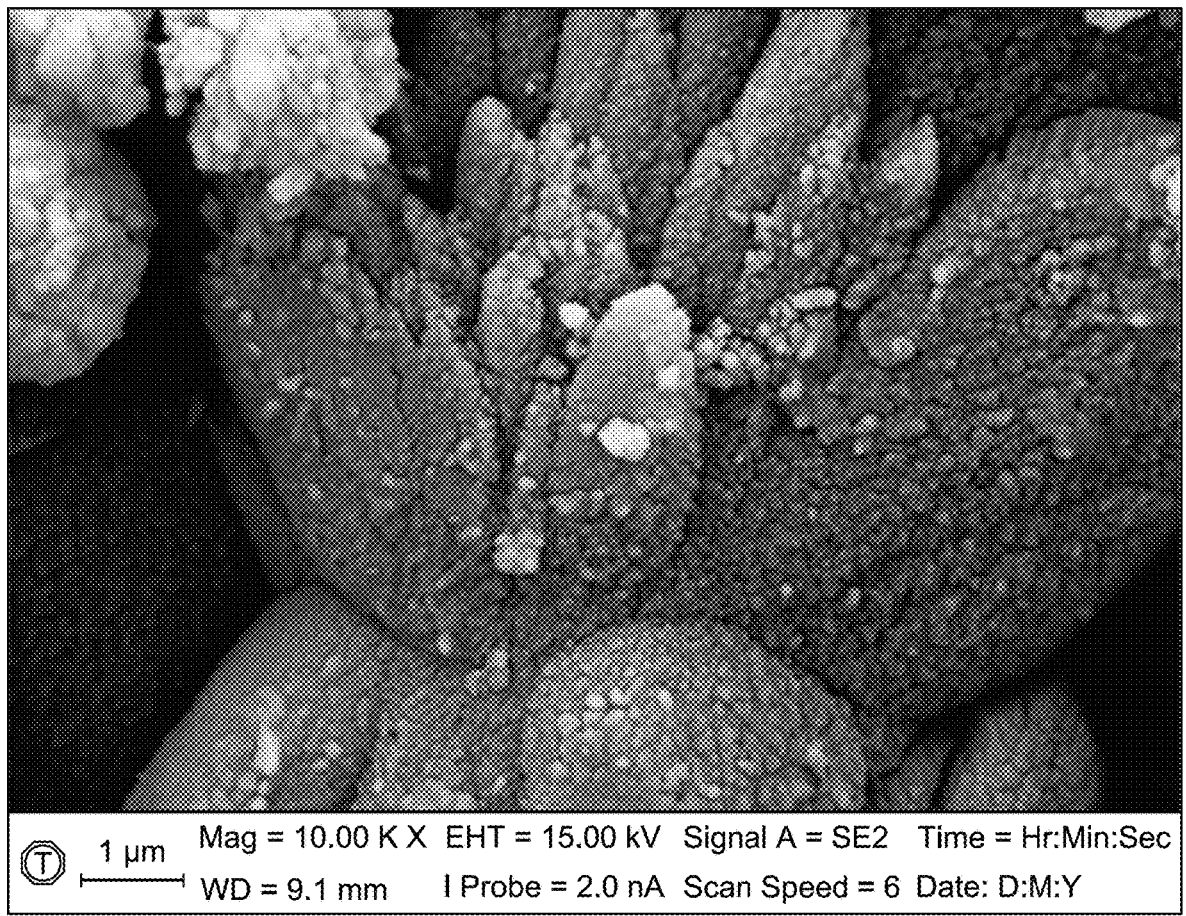
FIG. 5F is a SEM micrograph of precipitates under C/15-1 concentration at 1 μm magnification, according to certain embodiments.
Figure 5G:
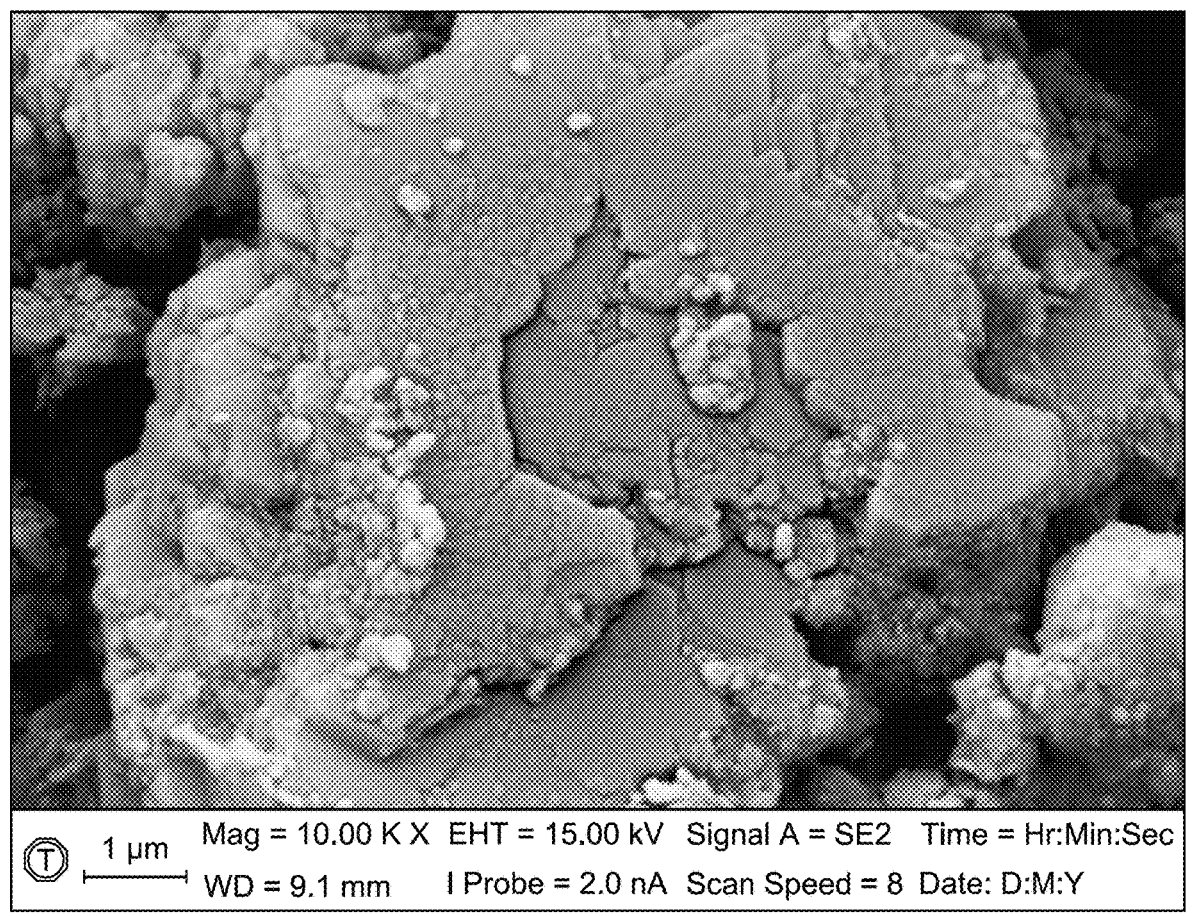
FIG. 5G is a SEM micrograph of precipitates under C/15-1 concentration at 1 μm magnification, according to certain embodiments.
Figure 5H:
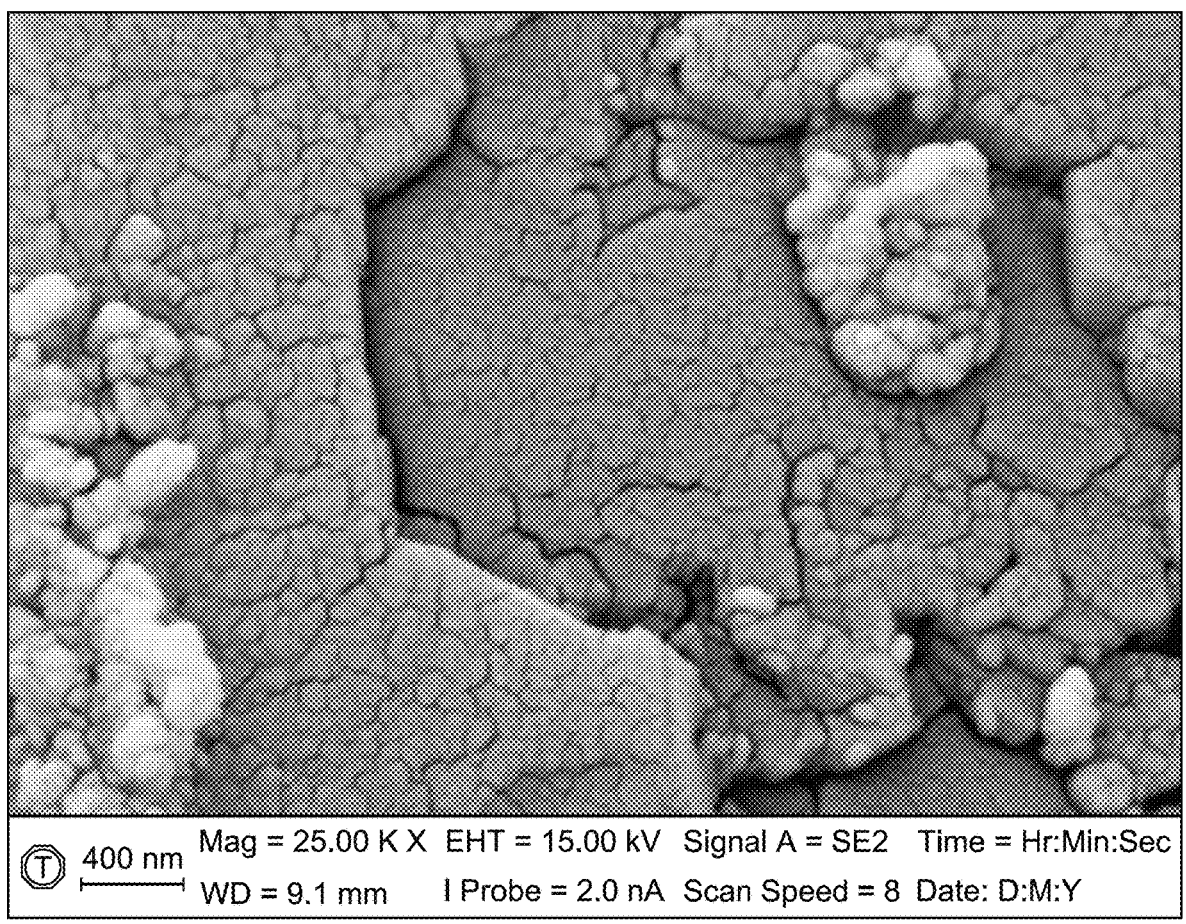
FIG. 5H is a SEM micrograph of precipitates under C/15-1 concentration at 400 nm magnification, according to certain embodiments.
Figure 6A:
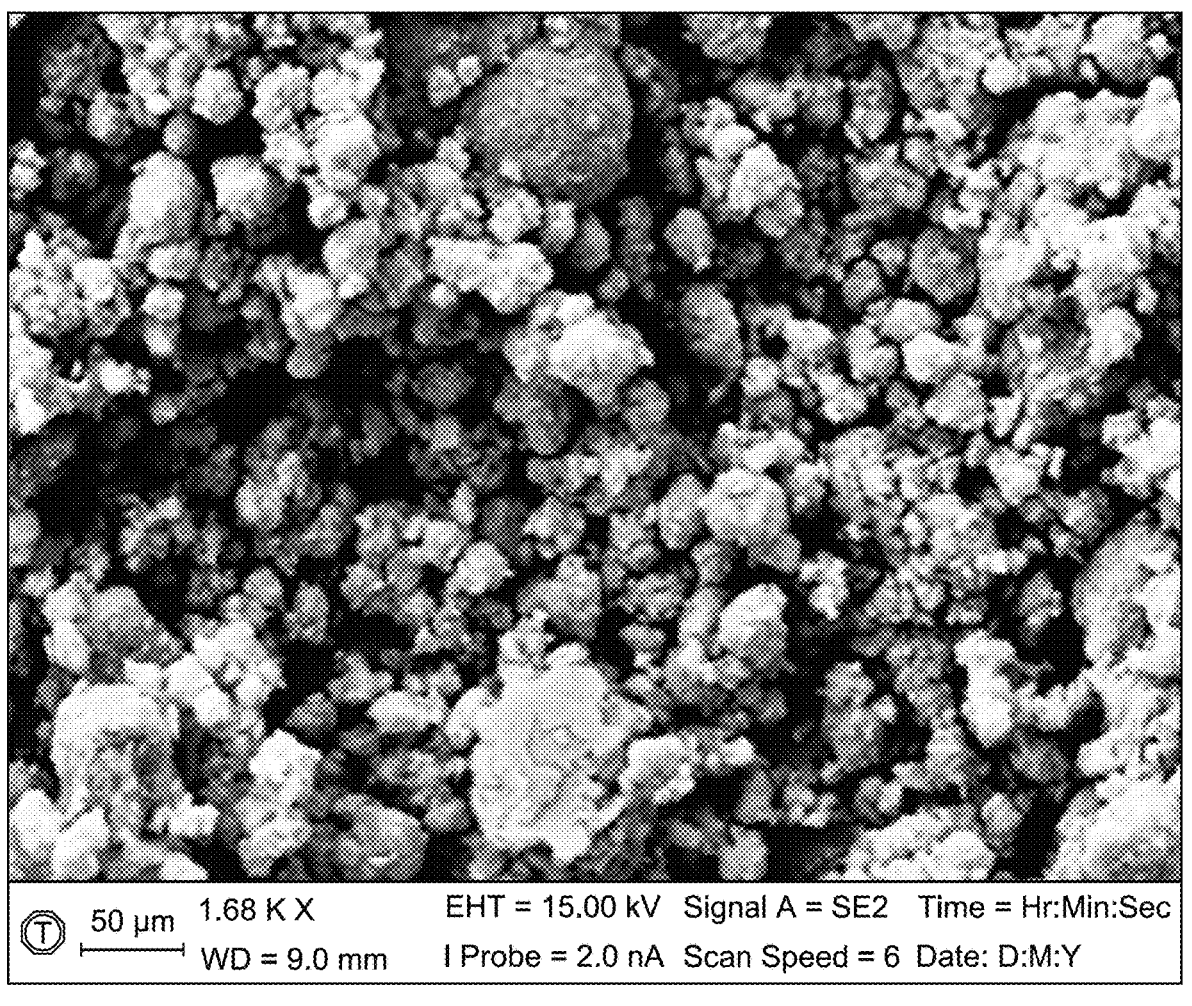
FIG. 6A is a SEM micrograph of precipitates, according to certain embodiments.
Figure 6B:
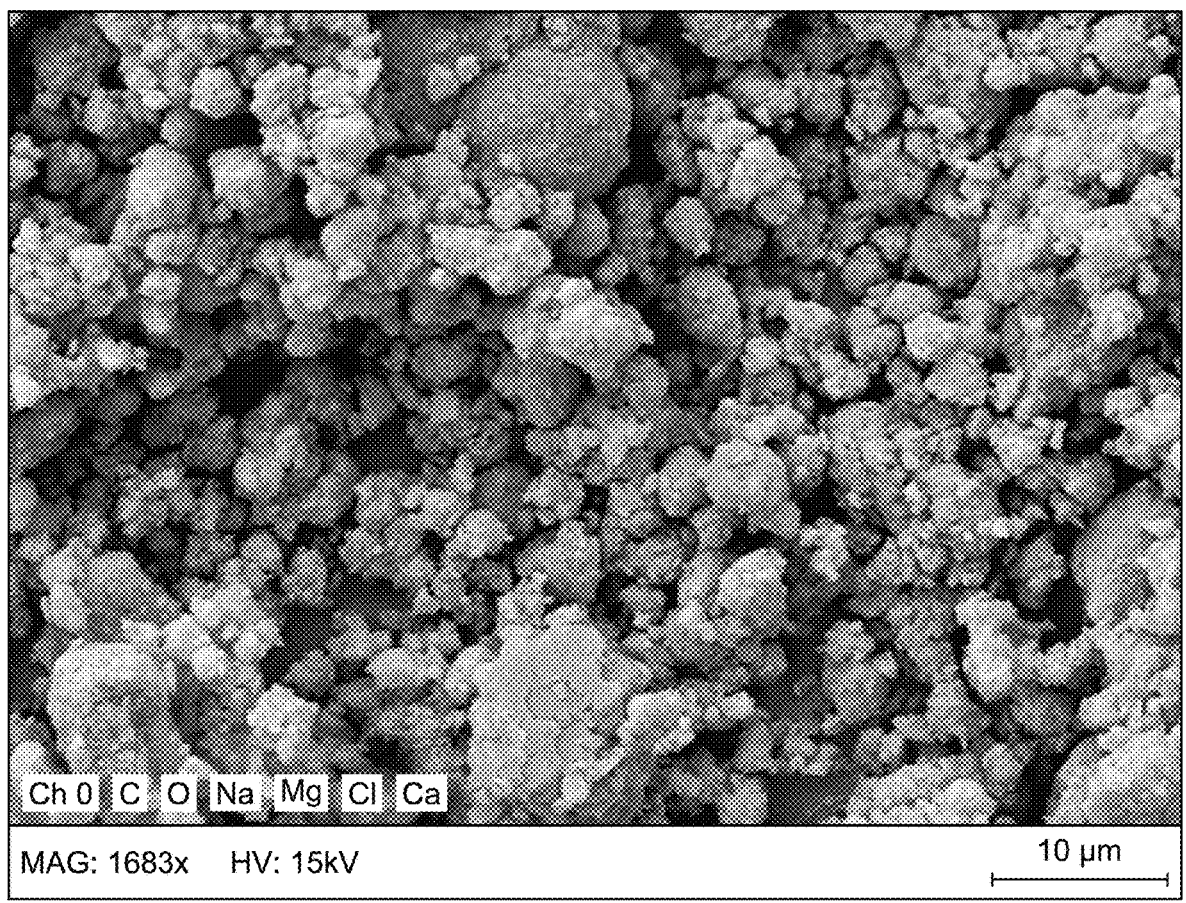
FIG. 6B is an energy dispersive x-ray spectroscopy (EDS) of precipitates showing all elements, according to certain embodiments.
Figure 6C:
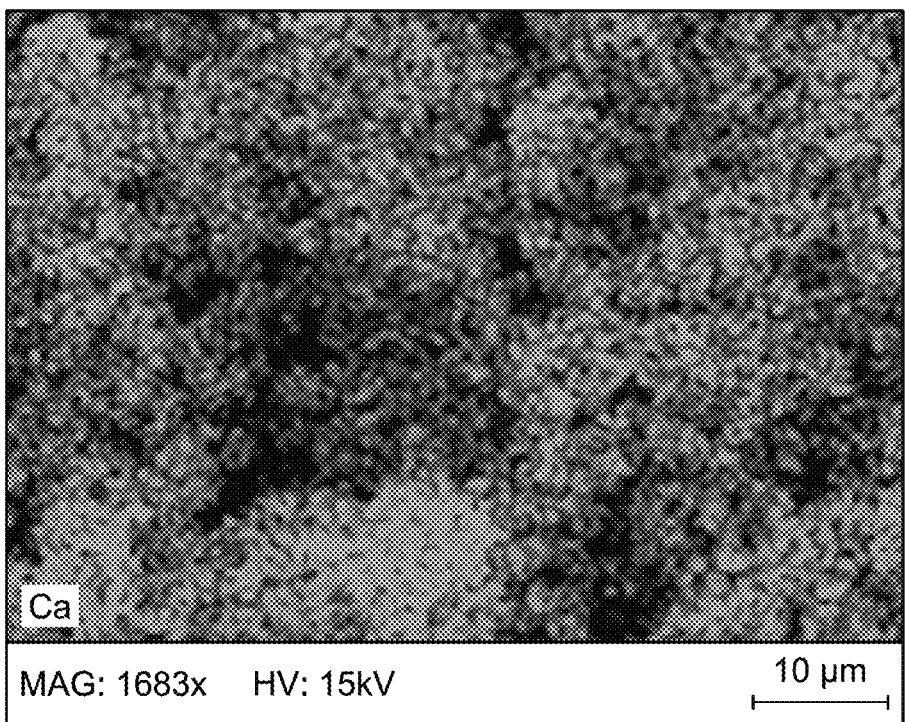
FIG. 6C is a SEM-EDS elemental spectrum of precipitates showing calcium element, according to certain embodiments.
Figure 6D:
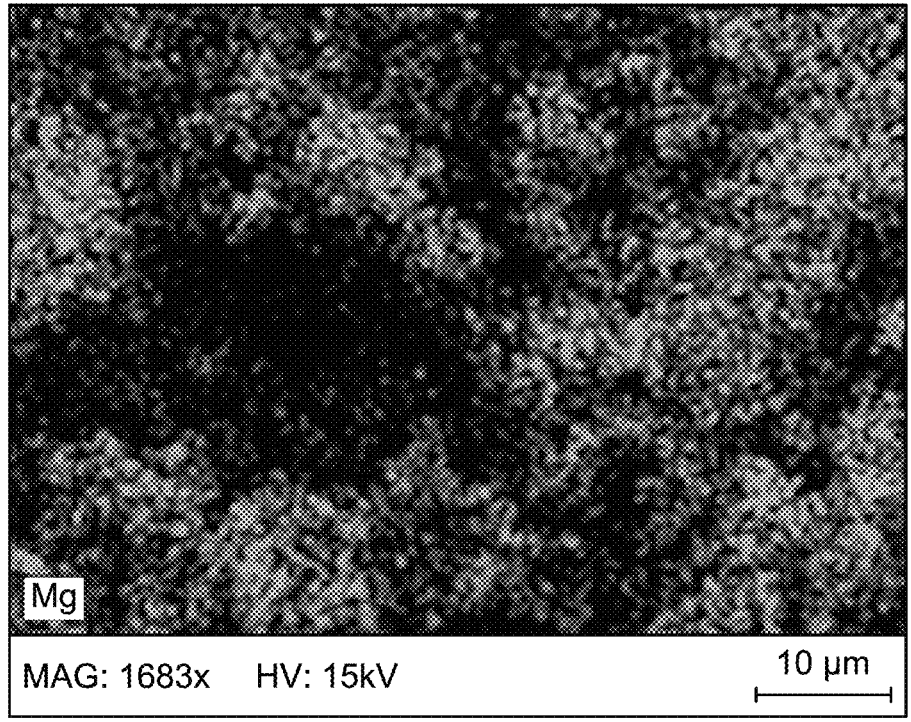
FIG. 6D is a SEM-EDS elemental spectrum of precipitates showing magnesium element, according to certain embodiments.
Figure 6E:
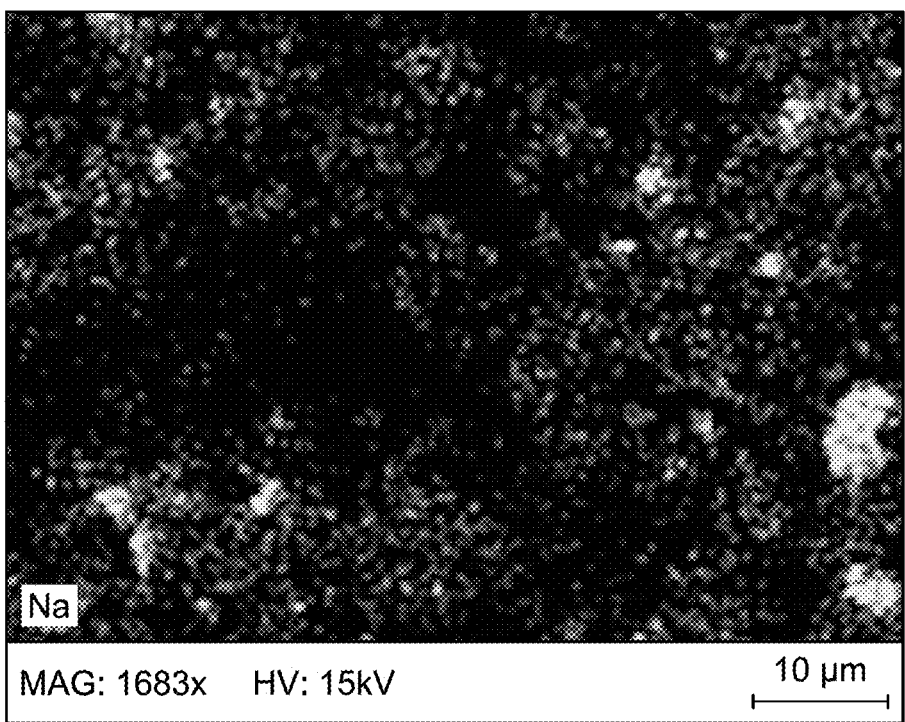
FIG. 6E is a SEM-EDS elemental spectrum of precipitates showing sodium element, according to certain embodiments.
Figure 6F:
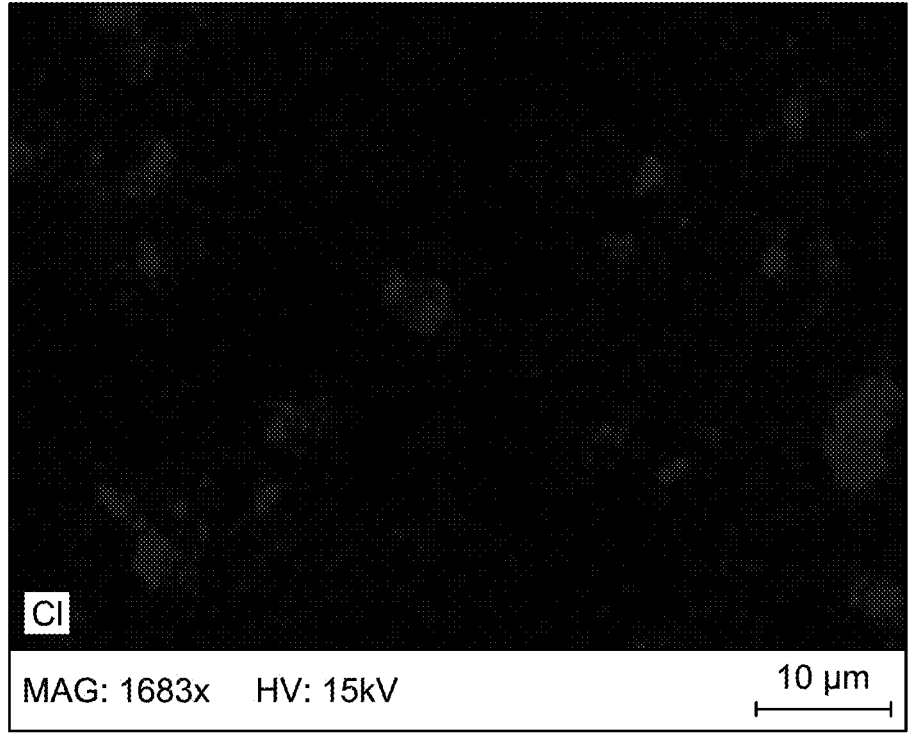
FIG. 6F is a SEM-EDS elemental spectrum of precipitates showing chlorine element, according to certain embodiments.
Figure 6G:
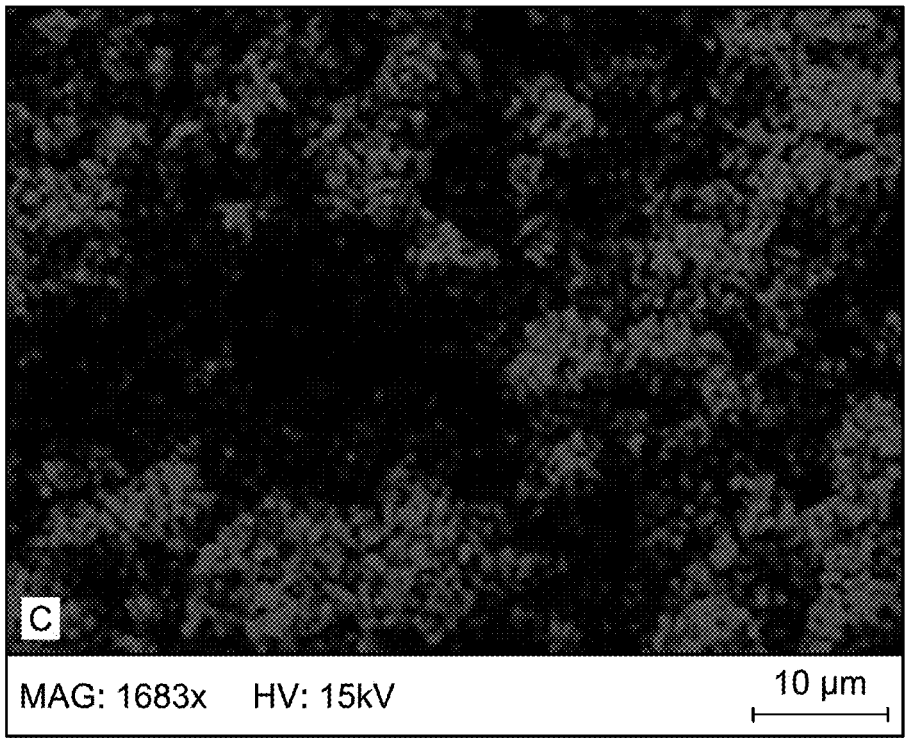
FIG. 6G is a SEM-EDS elemental spectrum of precipitates showing carbon element, according to certain embodiments.
Figure 6H:
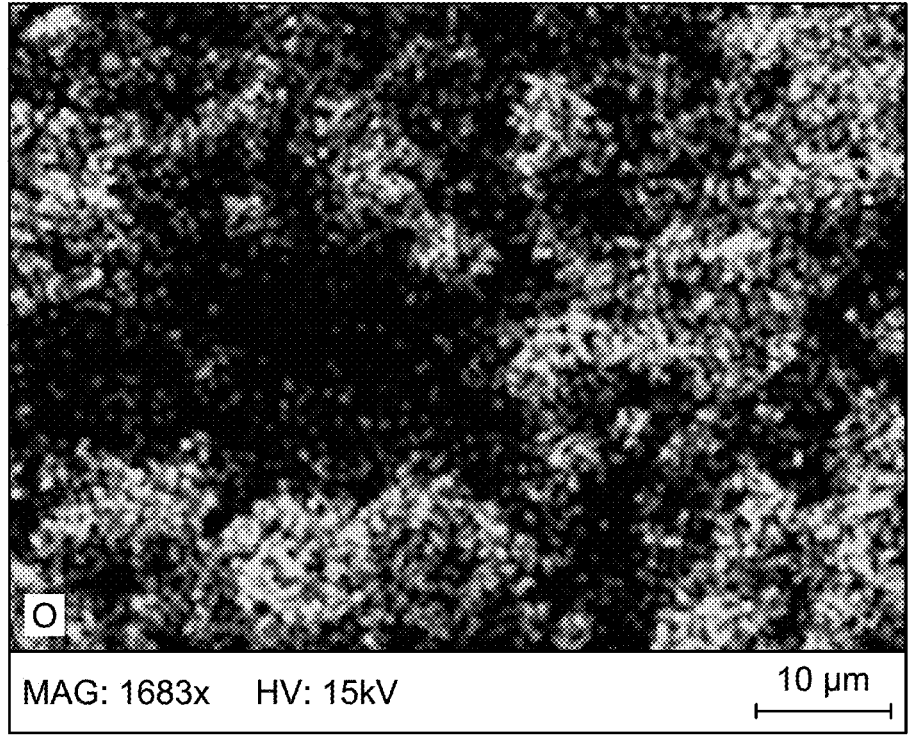
FIG. 6H is a SEM-EDS elemental spectrum of precipitates showing oxygen element, according to certain embodiments.
Figure 6I:
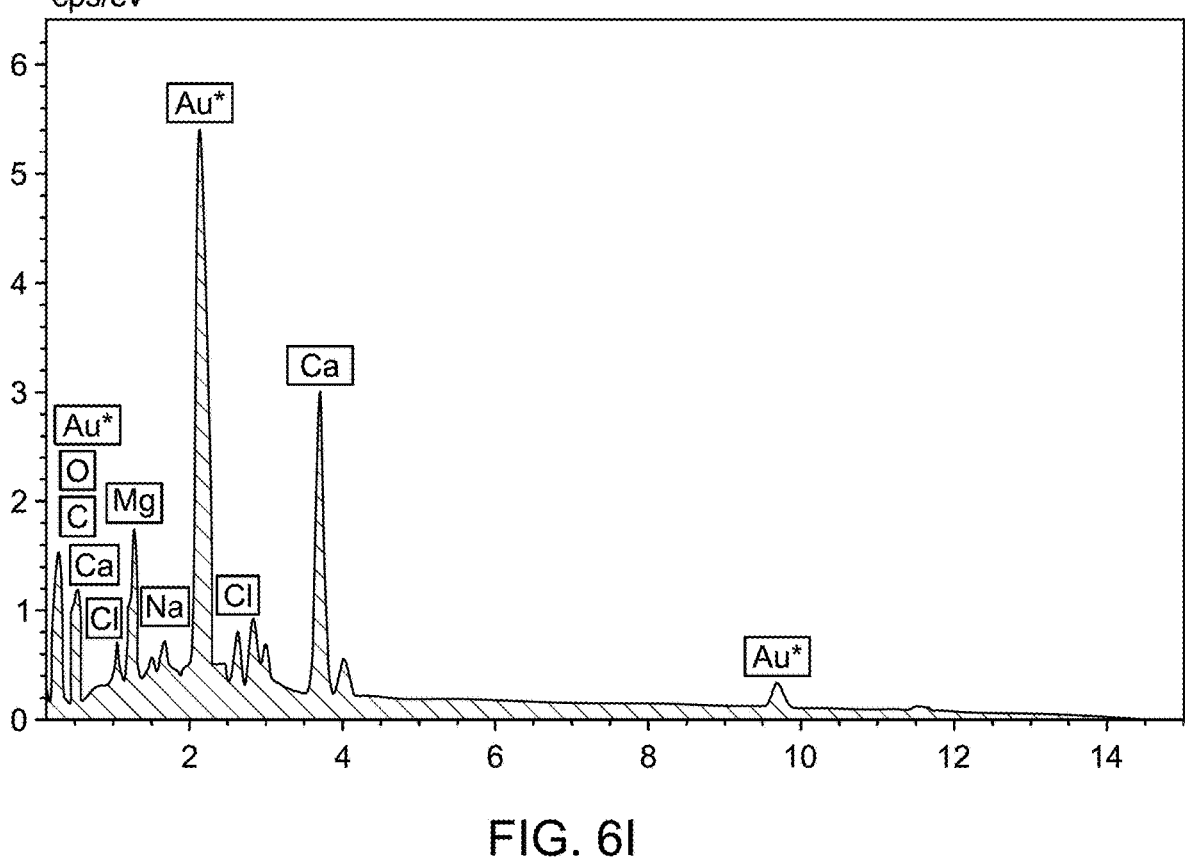
FIG. 6I is a SEM-EDS spectrum of precipitates showing the chemical composition, according to certain embodiments.

The morphology, microstructure, and elemental composition of the three precipitates were examined using SEM-EDS. Representative SEM micrographs for each condition are presented in FIGS. 5A-H. The precipitates are predominantly formed as aggregates composed of much smaller primary particles, exhibiting a characteristic globular or botryoidal structure often described as "cauliflower-like". This morphology is frequently associated with the rapid precipitation of carbonate minerals from complex aqueous solutions like seawater, where high supersaturation levels and the presence of various ions (notably $Mg^{2+}$) can inhibit the development of well-defined crystal faces and promote the formation of aggregated, near-amorphous, or poorly crystalline phases. At the highest concentration tested (1 wt. % C/15), the characteristic globular aggregates persisted (FIGS. 5E-5H). When compared to other samples, it exhibits a greater degree of inter-aggregate fusion, giving well-defined rose-like and rhombohedral crystals aggregated from the globular or cauliflower-like particles (FIGS. 5F-5H). This observation could indicate that higher surfactant concentrations subtly influence the aggregation process, potentially affecting cohesion of the secondary structures, possibly by modifying surface charges.

Energy Dispersive X-ray Spectroscopy (EDS) was employed to gain insights into the elemental composition of the precipitates. The elemental composition and maps shown in Table 5 and FIGS. 6A-I show that Ca is dominant in all samples (~23 wt. %), confirming calcite as the primary mineralization product, with Mg at ~7.7 wt. %, indicating brucite co-precipitation due to seawater's high $Mg^{2+}$ content, and Cl and Na representing ~1.7 and 1.9 wt. % respectively, reflecting halite (NaCl) retention from seawater, with C at ~21 wt. % which is likely from residual surfactant and carbonate ions.

TABLE 5 elemental composition of the precipitated
materials analyzed by SEM-EDS.

| Element | Line Type | Atomic Number | Wt. % | Wt. % Sigma (Absolute Error %) |
|---|---|---|---|---|
| O | K series | 8 | 44.25 | 0.36 |
| Ca | K series | 20 | 23.01 | 0.13 |
| Mg | K series | 12 | 7.75 | 0.06 |

TABLE 5-continued elemental composition of the precipitated
materials analyzed by SEM-EDS.

| Element | Line Type | Atomic Number | Wt. % | Wt. % Sigma (Absolute Error %) |
|---|---|---|---|---|
| Cl | K series | 17 | 1.75 | 0.02 |
| Na | K series | 11 | 1.89 | 0.02 |
| C | K series | 6 | 21.35 | 0.85 |
| Total | | | 100 | |

Figure 7:
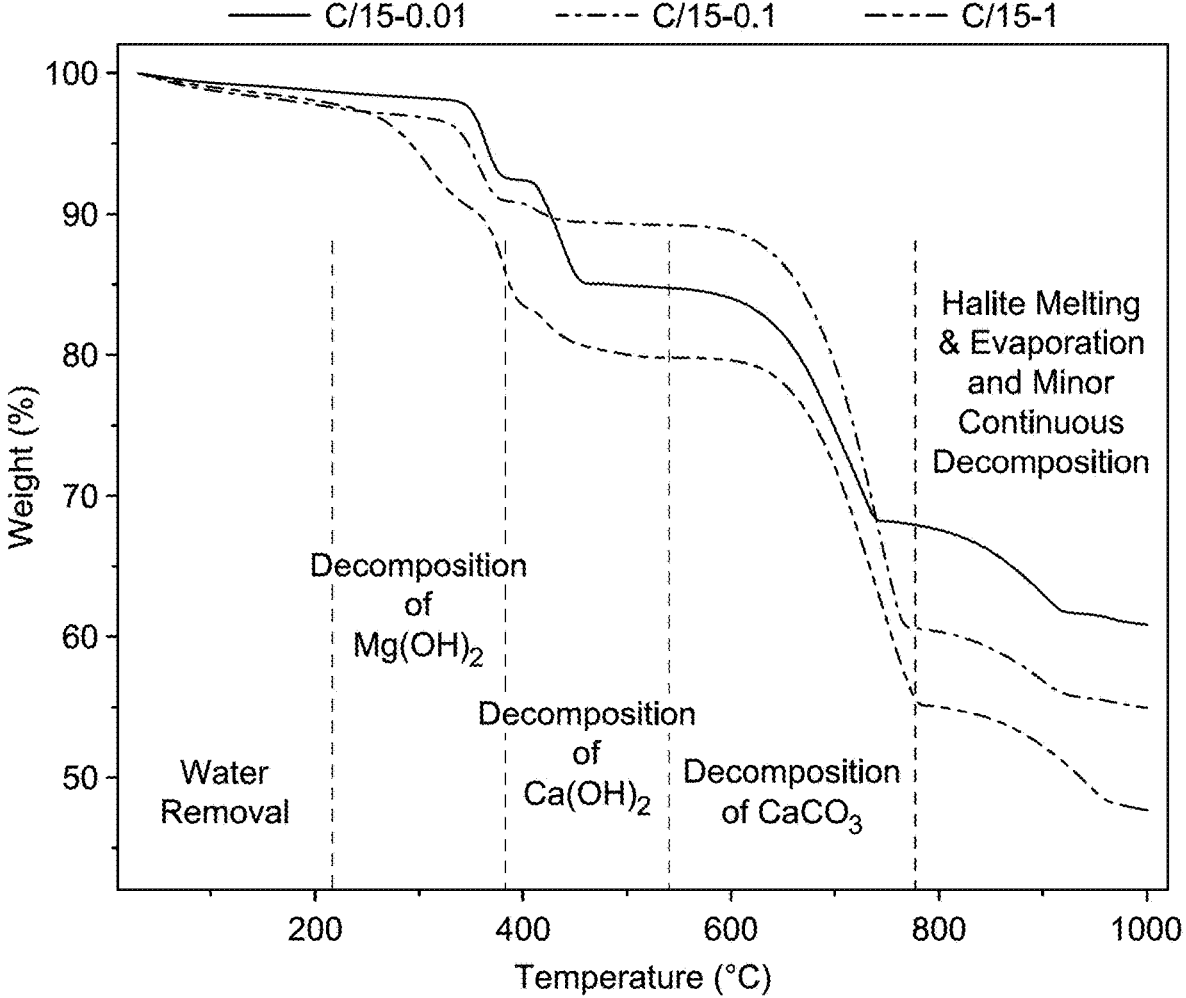
FIG. 7 is a thermogravimetric analysis (TGA) of the three precipitates from $CO_2$ injection in seawater with varying surfactant concentrations (0.01 wt. %, 0.1 wt. %, and 1 wt. %), according to certain embodiments.

The TGA results of the three samples are shown in Table 6 and FIG. 7. The results show that the initial weight loss (Dehydration) in all samples corresponds to moisture content or physically absorbed water. Brucite content appears consistent across samples (6.03%, 6.35%, 7.12%), and it leads to the release of bound water, which reduces the material's mass. The weight loss of portlandite is inconsistent: 7.59% (0.01%), 1.61% (0.1%), and 2.59% (1%). The sharp drop at 0.1% implies competitive precipitation where C/15 surfactant may inhibit $Ca(OH)_2$ formation at mid-concentration, and favor $Mg(OH)_2$ or $CaCO_3$ instead. The primary weight loss occurs according with the decomposition of calcite, where the C/15-0.1 sample shows the highest calcite content (28.62%), indicating this as the most useful surfactant concentration (0.1%) for $CO_2$ mineralization. However, the decomposition onset shifts to higher temperatures (550° C. for 0.01% vs. 590° C. for 1%), indicating improved calcite thermal stability at higher surfactant concentrations. This is possibly due to increase in crystallinity or particle size effect. The weight loss due to calcite decomposition $(CaCO_3)$ is the largest contributor in all samples, but its share increases with C/15 concentration, indicating enhanced carbonation efficiency with more surfactant. The final weight loss step is attributed to the melting and evaporation of halite and any residual minor continuous decomposition. The magnitude of this loss increases by increasing the C/15 content, reflecting increased halite precipitation at higher surfactant concentrations. It likely originates from residual salts trapped in the precipitated matrix. The C/15-0.01 sample (0.01 wt. % C/15 surfactant) shows higher stability at elevated temperatures, with the least weight loss compared to the C/15-0.1 and C/15-1 samples. The presence of C/15 surfactant promotes the formation of more reactive, less stable, and more decomposable mineral phases (e.g. calcite and brucite), and this is reflected in the increased total weight loss at higher C/15 concentrations. Brucite decomposes at lower temperatures (~330-396° C.) than portlandite (~380-46° C.), making portlandite more thermally stable. However, brucite's higher weight loss in surfactant-rich samples indicates it is a major contributor to early-stage instability. The C/15 surfactant modulates the precipitation and thermal behavior of $CO_2$-derived minerals. While higher concentrations improve $CO_2$ mineralization capacity, they also introduce trade-offs in phase distribution and thermal stability. Increasing the C/15 surfactant concentration during $CO_2$ injection in seawater increases both the quantity and reactivity (lower thermal stability) of precipitated minerals. The process is highly efficient for $CO_2$ mineralization, including at higher surfactant concentrations, but the resulting products may be less thermal stable at elevated temperatures.

TABLE 6

Summary of the TGA results for C/15 samples with varying
surfactant concentrations (0.01 wt. %, 0.1 wt. %, and
1 wt. %). The table also highlights mineral decomposition
reactions in the flowing $N_2$ atmosphere.

| Sample | Species | Reaction Type | Temperature Range (° C.) | Weight Loss (%) | Total weight Loss (%) |
|---|---|---|---|---|---|
| C/15-0.01 | Water | Dehydration (Desorption) | 30-214 | 1.45 | 39.04 |
| | Brucite | Dehydroxylation ($Mg(OH)_2 \rightarrow MgO + H_2O$) | 330-390 | 6.03 | |
| | Portlandite | Dehydroxylation ($Ca(OH)_2 \rightarrow CaO + H_2O$) | 405-460 | 7.59 | |
| | Calcite | Endothermic Decomposition ($CaCO_3 \rightarrow CaO + CO_2$) | 550-740 | 16.59 | |
| | Halite & others | Endothermic: melting, Then evaporation | 750-1000 | 7.36 | |
| C/15-0.1 | Water | Dehydration (Desorption) | 30-210 | 2.70 | 44.86 |
| | Brucite | Dehydroxylation ($Mg(OH)_2 \rightarrow MgO + H_2O$) | 327-375 | 6.35 | |
| | Portlandite | Dehydroxylation ($Ca(OH)_2 \rightarrow CaO + H_2O$) | 380-430 | 1.61 | |
| | Calcite | Endothermic Decomposition ($CaCO_3 \rightarrow CaO + CO_2$) | 575-770 | 28.62 | |
| | Halite & others | Endothermic: melting, Then evaporation | 775-1000 | 5.56 | |
| C/15-1 | Water | Dehydration (Desorption) | 30-207 | 2.03 | 52.19 |
| | Brucite | Dehydroxylation ($Mg(OH)_2 \rightarrow MgO + H2O$) | 340-396 | 7.12 | |
| | Portlandite | Dehydroxylation ($Ca(OH)_2 \rightarrow CaO + H_2O$) | 402-450 | 2.59 | |
| | Calcite | Endothermic Decomposition ($CaCO_3 \rightarrow CaO + CO_2$) | 590-780 | 24.22 | |
| | Halite & others | Endothermic: melting, Then evaporation | 787-1000 | 7.48 | |

Figure 8A:
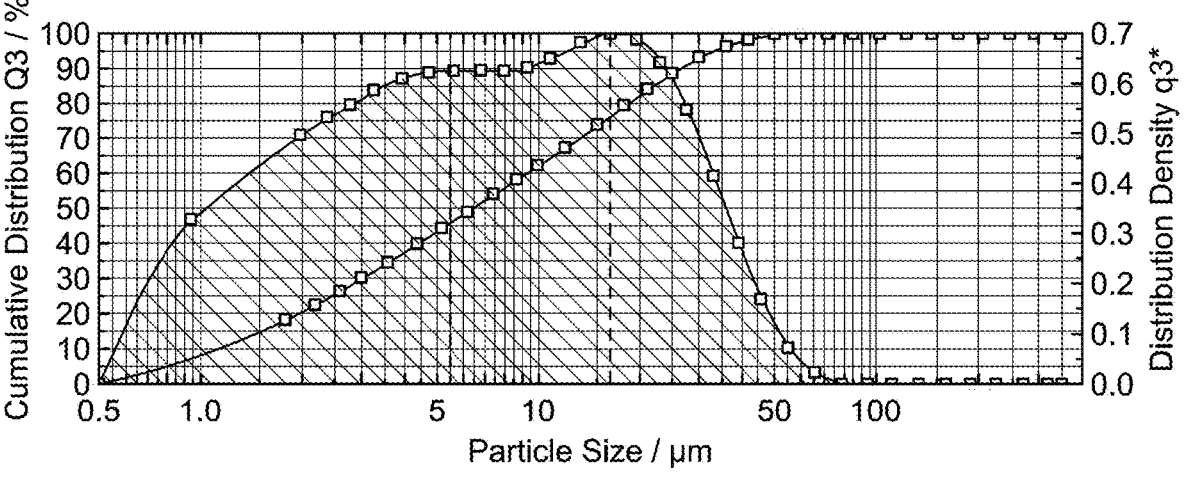
FIG. 8A is a particle size distribution curves of the precipitated materials obtained at C/15-0.01 surfactant concentration, according to certain embodiments.
Figure 8B:
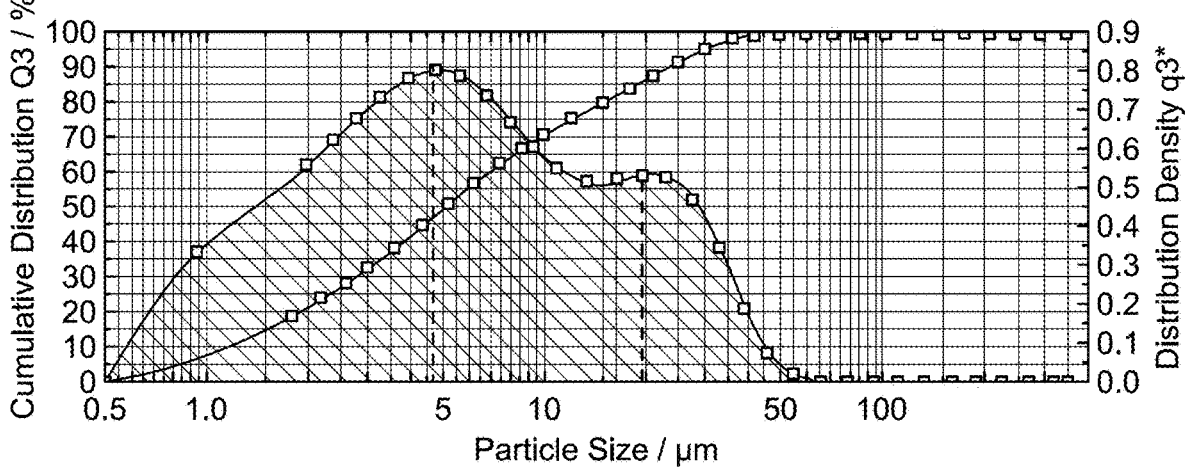
FIG. 8B is a particle size distribution curves of the precipitated materials obtained at C/15-0.1 surfactant concentration, according to certain embodiments.
Figure 8C:
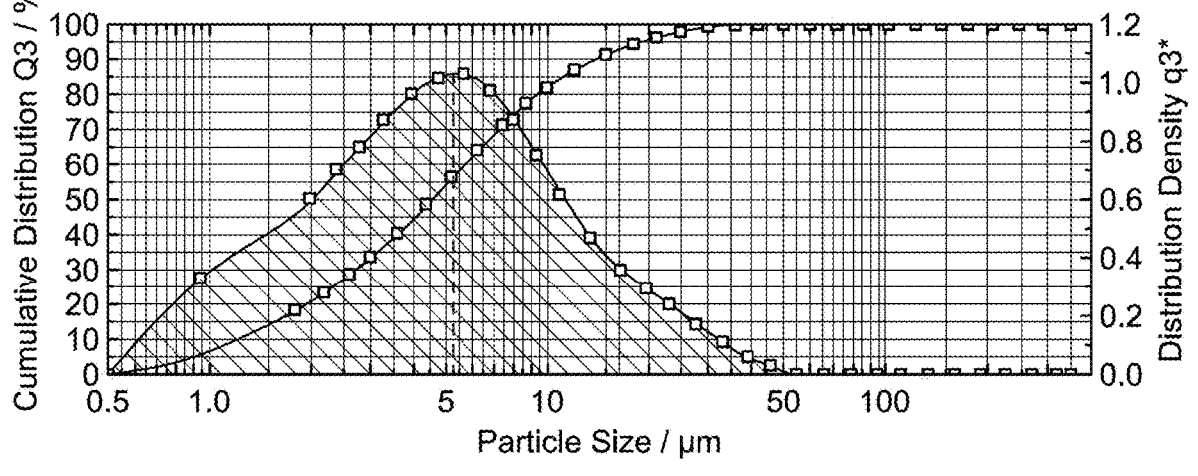
FIG. 8C is a particle size distribution curves of the precipitated materials obtained at C/15-1 surfactant concentration, according to certain embodiments.

Based on the particle size measurements, there is a progressive decrease in particle size of the precipitates by increasing the C/15 concentration from 0.01 wt. % to 1 wt. %. The median particle size ($X_{50}$) decreases from 6.47 µm (C/15-0.01) to 4.92 µm (C/15-0.1), then to 4.01 µm (C/15-1), and the volume mean diameter (VMD) decreases from 10.73 µm (C/15-0.01) to 7.71 µm (C/15-0.1), then to 5.27 µm (C/15-1). The surface area (Sm) increases from 5499 cm²/g (C/15-0.01) to 6055 cm²/g (C/15-0.1), then to 6869 cm²/g (C/15-1), where this increased surface area could enhance reactivity or adsorption properties. C/15-1 shows a narrow unimodal distribution with minimal skew, while C/15-0.01 and C/15-0.1 show a likely bimodal, positive, and broad particle size distribution (FIG. 8).

Zeta potential measures the electrical charge at the surface of particles in a solution determining whether they repel or attract each other. In this present disclosure, how varying C/15 surfactant concentrations modulate this charge with direct impact on colloidal stability and industrial applicability, whether for stable dispersions or controlled aggregation, is analyzed. Table 7 demonstrates that ZP of C/15-0.01 is strongly positive (13.4 mV) where particles repel and stabilize dispersion, and ZP of C/15-0.1 is moderately positive (5.5 mV) where particles give partial aggregation and dispersion, while ZP of C/15-1 is slightly negative (−0.9 mV) where aggregation dominates. Low standard deviation (±0.7 mV) at C/15-0.01 and C/15-1 indicate consistent particle behavior, while slightly higher deviation (±1.0 mV) at C/15-0.1 indicates variability in surfactant coverage.

TABLE 7

Mean zeta potential values of the three precipitates.

| Sample | 7-potential (mV) | Standard Deviation (mV) |
|---|---|---|
| C/15-0.01 | 13.4 | 0.7 |
| C/15-0.1 | 5.5 | 1.0 |
| C/15-1 | −0.9 | 0.7 |

C/15 Surfactant-Mediated Mineralization Efficiency and Phases Evolution

The different concentrations of the nonionic amine-based surfactant C/15 in the PW-$CO_2$ system profoundly influenced the mineralization pathways as evidenced by multi-technique characterization. WDXRF analysis (Table 4) revealed that CaO was the most prevalent of the precipitates (72.81-76.15 wt. %) with inverse proportionality to surfactant concentration. This trend aligns with the XRD findings (FIG. 3), where the content of calcite and portlandite (Ca-bearing minerals) together reached 69.9 wt. % at 0.01 wt. % of C/15, outperforming higher 0.1 wt. % C/15 (65 wt. %) and 1 wt. % C/15 (62 wt. %) concentrations. The highest CaO content at the lowest surfactant concentration indicates that minimal surfactant presence favors calcium carbonate precipitation, likely due to less interference with $Ca^{2+}$ ion availability or nucleation sites. Conversely, at higher surfactant concentrations, CaO content decreases slightly, while sodium oxide ($Na_2O$) and chlorine (Cl) contents increase markedly. This is because Na content from NaOH, and also C15 has Na content. Therefore, Na should increase with increasing C15, with halite being incorporated within the precipitate matrix. This trend correlates well with the XRD results, which show a rise in halite phase abundance from 6.2% at 0.01 wt. % to 12.0% at 1 wt. % C/15, indicating surfactant-induced morphological or electrostatic changes that favor salt entrapment or precipitation. Elemental mapping (FIG. 6) confirmed Ca as the primary element (~23 wt. %), with major Mg (~7.7 wt. %) and minor Na and Cl localized in halite inclusions, underscoring the need for post-washing in chloride-sensitive applications like the cement industry. FT-IR spectra (FIG. 4) also confirmed to calcite's primary content and the co-precipitation of brucite ($Mg(OH)_2$) and portlandite ($Ca(OH)_2$).

The reaction between $CO_2$ and PW results in the formation of carbonic acid (Eq. 1), which subsequently reacts with the dissolved ions of $Ca^{2+}$ and $Mg^{2+}$ (Eq. 3 and 4). The precipitation of minerals such as brucite, portlandite, and calcite is facilitated by the addition of non-anionic amine-based C/15 surfactant and NaOH, where they increase the pH incrementally. The solubility of magnesium hydroxide ($Mg(OH)_2$) is 0.00069 g/100 g $H_2O$ at 20° C., whereas that of calcium hydroxide ($Ca(OH)_2$) is 0.160 g/100 g $H_2O$ at 20° C. Therefore, it is helpful to acknowledge that the addition of C/15 to the carbonated solution containing $Mg^{2+}$ and $Ca^{2+}$ ions will promote the precipitation of brucite ($Mg(OH)_2$) rather than portlandite ($Ca(OH)_2$). Conversely, $CO^{3-}$ anion prefers reacting with $Ca^{2+}$ rather than $Mg^{2+}$ to form calcite ($CaCO_3$), due to this being the more thermodynamically stable polymorph of $CaCO_3$ at room temperature and atmospheric pressure. Also, the solubility of calcium carbonate ($CaCO_3$) is 0.00066 g/100 g $H_2O$ at 20° C., while it is 0.18 g/100 g $H_2O$ at 20° C. for magnesium carbonate ($MgCO_3$). The calcite, brucite, and portlandite are present as primary phases in all samples at different concentrations of C/15, which indicates that calcite precipitates first, then brucite, and lastly portlandite. Removing $Mg^{2+}$ and $Ca^{2+}$ and precipitating brucite, portlandite, and calcite minerals in considerable amounts has economic value, including for industries like construction and agriculture. Precipitation of brucite ($Mg(OH)_2$) enhances the $CO_2$ mineralization efficiency as well as calcite ($CaCO_3$) precipitation and extraction, where brucite can be considered as the rate controller in the carbonation process. The change of portlandite concentration from high (at 0.01 wt. % C/15) to low (at 1 wt. % C/15), indicates that both C/15 and NaOH manipulate the pH condition. The increase of halite is attributed to the presence of NaOH, and C/15 also has Na content, so the incremental increase of C/15 concentrations is reflected in the rise of halite concentrations. Also, micellar shielding overrides ionic effects and entraps the salt in the precipitate's porous structure. This also allows a selection of some phases to precipitate at the expense of others across different concentrations of C/15. However, the concentrations of Na and Cl ions are still low in the different precipitates, making the extraction and precipitation of Ca and Mg a more favorable process. In general, the precipitation of Ca- and Mg-bearing minerals in considerable amounts enhances the $CO_2$ mineralization performance.

$$CO_2(g) + H_2O(l) \rightarrow H_2CO_3(aq) \rightarrow H^+(aq) + HCO_3^-(aq) \quad (1)$$

$$HCO_3^-(aq) \leftrightarrow H^+(aq) + CO_3^{2-}(aq) \quad (2)$$

$$Ca^{2+}(aq) + CO_3^{2-}(aq) \rightarrow CaCO_3(s) \quad (3)$$

$$Mg^{2+}(aq) + CO_3^{2-}(aq) \rightarrow MgCO_3(s) \quad (4)$$

Morphological and Colloidal Behavior

Scanning Electron Microscopy (SEM) coupled with Energy Dispersive X-ray Spectroscopy (EDS) (FIGS. 5A-5H and FIGS. 6A-6I) reveals that the precipitates consist of aggregated globular or cauliflower-like particles (amorphous) which are typical of rapid carbonate precipitation in complex aqueous matrices like seawater. At the highest surfactant concentration (1 wt. % C/15), these aggregates exhibit increased inter-particle fusion and the emergence of rose-like and rhombohedral crystal morphologies (FIGS. 5E-5H) which indicate that the surfactant concentration influences secondary particle cohesion and crystallinity.

Particle size analysis (FIG. 8) shows a clear trend of decreasing median particle size ($X_{50}$) from 6.47 µm at 0.01 wt. % C/15 to 4.01 µm at 1 wt. % C/15, accompanied by increased surface area. This reduction in particle size and narrowing of size distribution at higher surfactant concentrations likely results from surfactant molecules (micelles) adsorbing on precipitated particle surfaces, inhibiting crystal growth and promoting nucleation of smaller particles. Such behavior enhances the reactive surface area of the precipitate, potentially improving $CO_2$ mineralization kinetics.

Zeta potential measurements (Table 7) reveal a shift from a strongly positive surface charge at 0.01 wt. % C/15 (+13.4 mV) to near-neutral or slightly negative at 1 wt. % (−0.9 mV), indicating a transition from stable colloidal dispersions to aggregation-dominated systems. This charge modulation by surfactant concentration affects particle-particle interactions, influencing slurry rheology and settling behavior, which are parameters in industrial-scale mineralization reactors and downstream processing.

Thermal Stability and Decomposition Dynamics

Thermogravimetric analysis (TGA; FIG. 7 and Table 6) provides insights into the thermal stability and phase composition of the precipitates. It complements mineralogical data (XRD and FTIR). The initial weight loss below 214° C. is consistent across samples and corresponds to dehydration of physically adsorbed water (moisture loss). Subsequent weight losses at 330-460° C. are attributed to dehydroxylation of brucite and portlandite, with brucite decomposing at lower temperatures (~330-396° C.) than portlandite (~380-460° C.), indicating higher thermal stability of portlandite. The greatest mass loss occurs between 550-780° C., corresponding to calcite decomposition ($CaCO_3 \rightarrow CaO + CO_2$). Notably, the onset temperature of calcite decomposition shifts from ~550° C. at 0.01 wt. % C/15 to ~590° C. at 1 wt. % C/15, indicating improved thermal stability and possibly increased crystallinity at higher surfactant concentrations. This argument aligns with the SEM observations of more defined crystal morphologies at 1 wt. % C/15 (FIGS. 5E-5H) and indicates that surfactant concentration can be tuned to balance mineralization efficiency and product stability. The final weight loss stage (750-1000° C.) is linked to minor continuous loss and notable halite melting and evaporation, with weight increasing at higher surfactant levels, consistent with the increased halite content detected by XRD and WDXRF. The overall increase in total weight loss with surfactant concentration reflects higher mineral precipitation but also indicates that surfactant presence leads to the formation of more reactive and less thermally stable phases (trade-off useful for process enhancement, including for high-temperature applications like cement calcination).

THEORETICAL AND INDUSTRIAL IMPLICATIONS

The integration of these multi-technique results provides a comprehensive understanding of how C/15 surfactant concentration modulates $CO_2$ mineralization in PW, with direct implications for industrial use and scientific research.

From an industrial perspective, the ability of C/15 surfactant to enhance carbonate and hydroxide precipitation, increase surface area, and modulate particle stability offers a pathway to improve mineralization reactors for higher $CO_2$ capture efficiency and tailored product properties. The formation of high-purity calcite, brucite, and portlandite phases with controlled morphology and thermal stability is advantageous for producing value-added materials such as carbonated aggregates or soil amendments, and this aligns with circular economy and sustainability goals. However, the incremental increased retention of salts (halite) at higher C/15 concentrations may require additional processing steps depending on the intended application. The rheological and colloidal behavior influenced by surfactant concentration, as evidenced by particle size and zeta potential data, impacts slurry handling, transport, and settling in industrial systems. Stable dispersions at low surfactant levels favor continuous flow processes, while controlled aggregation at higher concentrations might facilitate solid-liquid separation.

Theoretically, this disclosure advances the understanding of the amine-based surfactant (C/15)-mediated mineral nucleation and growth in complex ionic environments.

Industrially, it relates the products to different industrial uses. C/15 surfactants have not been studied previously in any kind of $CO_2$ mineralization and this disclosure opens the door to employ it in PW-based mineral carbonation. The observed trends in phase distribution, crystallinity, and thermal stability highlight the delicate balance between surfactant concentration, ion availability, and reaction kinetics. These insights contribute to the broader field of $CO_2$ sequestration in marine and geological settings, complementing recent advances using biobased chelating agents and foam-enhanced $CO_2$ storage in carbonate reservoirs. The surfactant's role in modulating ion interactions and phase stability parallels findings in $CO_2$ mineralization in mafic rocks and wastewater treatment contexts, underscoring the versatility of surfactant-assisted approaches.

Furthermore, Brucite $(Mg(OH)_2)$, portlandite $(Ca(OH)_2)$, and calcite $(CaCO_3)$ are useful products of the C/15 surfactant-mediated $CO_2$ mineralization in PW, each contributing distinct roles to circular economy. Brucite is a valuable mineral and has a wide range of applications. It has been commercially used in the production of absorbent pharmaceuticals, water treatment, antacids, and as an additive in paper products. Calcite (primary phase) provides long-term stability as a carbonate mineral widely used in construction and different industrial applications, providing durable $CO_2$ storage. Portlandite, though uncommon in conventional $CO_2$ sequestration systems due to its tendency to carbonate rapidly into calcite, it persists here as a byproduct which is likely stabilized by the C/15 surfactant's modulation of precipitation dynamics or local pH conditions. Portlandite can be used in cement and concrete industries as a bonding material. Its presence indicates incomplete carbonation but highlights the surfactant's unique ability to alter reaction pathways, offering insights into enhancing mineralization processes. These phases underscore the interplay between material reactivity, C/15 surfactant-mediated nucleation, and industrial applicability in marine or seawater carbon capture strategies.

The increasing concern over climate change has accelerated the search for sustainable solutions to reduce atmospheric $CO_2$ levels. The present disclosure investigates the feasibility of $CO_2$ sequestration in produced water (PW) using Ethomeen® C/15 surfactant at varying concentrations (0.01 wt. %, 0.1 wt. %, and 1 wt. %) to enhance $CO_2$ capture and mineralization. The surfactant facilitates the formation of stable carbonate precipitates, enabling efficient solid-phase $CO_2$ storage while repurposing PW for sustainable carbon management. The findings provide valuable insights into the roles of surfactant concentration, mineral phase formation, thermal stability, and colloidal behavior, advancing our understanding of how to enhance $CO_2$ sequestration processes and achieve the goals of circular economy and sustainability.

This present disclosure demonstrates the ability to control the mineralization process by varying the C/15 surfactant concentration in PW. It shows that it is possible to enhance $CO_2$ capture efficiency, with the C/15 concentration acting as the primary factor in the formation of calcite $(CaCO_3)$, brucite $(Mg(OH)_2)$, and portlandite $(Ca(OH)_2)$. These minerals are useful for long-term $CO_2$ storage because they provide a stable and secure form in which $CO_2$ can be trapped. The surfactant-mediated modification of mineral phase formation also provides a deeper understanding of $CO_2$ mineralization in PW, an area that has seen limited research compared to other forms of $CO_2$ capture systems. Accordingly, 0.1 wt. % C/15 can be ready for pilot testing in industry (e.g. low-carbon cement) because the product shows a high-purity calcite (59.7%) as a sustainable additive. This C/15 concentration balances calcite yield, halite retention, and particle stability. While previous studies have demonstrated the potential of mineral carbonation using $CO_2$ in various systems, including rocks, seawater, and wastewater, this work specifically addresses the role of surfactants and their concentrations in enhancing the efficiency of the carbonation reaction in PW using the nonionic surfactant (C/15).

This present disclosure demonstrates that the mineral phases formed can be controlled, which directly impacts the sequestration capacity and stability of the precipitates. The ability to fine-tune the formation of these minerals opens new avenues for large-scale $CO_2$ sequestration in marine environments and wastewater treatment plants, where mineralization efficiency and colloidal stability help determine applicability. Future studies could build on these findings by investigating the kinetics of $CO_2$ mineralization in different systems, exploring the long-term stability of the mineral phases under environmental conditions.

This present disclosure shows that the C/15 surfactant is a powerful tool for enhancing and controlling $CO_2$ mineralization in PW. By adjusting its concentration, the formation of desirable mineral products with tailored properties is achieved, supporting both carbon sequestration and the creation of valuable materials. It provides a foundation for future studies and potential industrial applications, advancing the goal of sustainable, scalable solutions to the global carbon challenge.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of carbon mineralization, comprising:
exposing a solution comprising a plurality of metal salts and a surfactant to carbon dioxide at a pressure in a range from 300 to 700 pounds per square inch (PSI) to form a carbonated solution;
adding a base to the carbonated solution until the pH is above 10 to form a reaction mixture; and
reacting the reaction mixture to form mineral precipitates, wherein the carbon dioxide reacts with the metal salts to form the mineral precipitates,
wherein the surfactant comprises a tertiary amine comprising one alkyl group and two ethoxylate groups comprising two or more ethoxy units,
wherein the mineral precipitates comprise calcite in a range from 30 to 70 weight percent (wt. %), portlandite in a range from 1 to 40 wt. %, brucite in a range from 15 to 35 wt. %, and halite in a range from 3 to 20 wt. %, based on the total weight of mineral precipitates, and
wherein the mineral precipitates are in the form of particles having an average size in a range from 1 to 75 µm.

2. The method of claim 1, wherein the mineral precipitates comprise calcite in a range from 35 to 65 wt. %, portlandite in a range from 3 to 35 wt. %, brucite in a range from 20 to 30 wt. %, and halite in a range from 5 to 15 wt. %, based on the total weight of mineral precipitates.

3. The method of claim 2, wherein the mineral precipitates comprise calcite in a range from 39 to 60 wt. %, portlandite in a range from 5 to 30 wt. %, brucite in a range from 23 to 27 wt. %, and halite in a range from 6 to 13 wt. %, based on the total weight of mineral precipitates.

4. The method of claim 1, wherein the mineral precipitates are in the form of particles having an average size in a range from 2 to 50 μm.

5. The method of claim 4, wherein the mineral precipitates are in the form of particles having an average size in a range from 3 to 10 μm.

6. The method of claim 1, wherein the reaction mixture is reacted at 20 to 40° C. for 12 to 36 hours to form the mineral precipitates.

7. The method of claim 1, wherein the exposing to carbon dioxide is performed at a pressure in a range from 400 to 600 PSI at 20 to 40° C. for 15 minutes to 3 hours to form the carbonated solution.

8. The method of claim 1, wherein the exposing is performed in a mixing reactor operating at 300 to 700 revolutions per minute (RPM) and the base is sodium hydroxide.

9. The method of claim 1, wherein the solution comprises the surfactant in a range from 0.01 to 10.0 weight percent (wt. %), based on the total weight of the solution.

10. The method of claim 9, wherein the solution comprises the surfactant in a range from 0.01 to 5 weight percent (wt. %), based on the total weight of the solution.

11. The method of claim 10, wherein the solution comprises the surfactant in a range from 0.01 to 1.0 weight percent (wt. %), based on the total weight of the solution.

12. The method of claim 1, wherein the solution comprises NaCl in a range from 30,000 to 70,000 parts per million (ppm), $MgCl_2 \cdot 6H_2O$ in a range from 6,000 to 11,000 ppm, $CaCl_2 \cdot 2H_2O$ in a range from 16,000 to 22,000 ppm, and $Na_2SO_4$ in a range from 500 to 2,000 ppm.

13. The method of claim 12, wherein the solution comprises NaCl in a range from 40,000 to 60,000 ppm, $MgCl_2 \cdot 6H_2O$ in a range from 7,000 to 10,000 ppm, $CaCl_2 \cdot 2H_2O$ in a range from 17,000 to 21,000 ppm, and $Na_2SO_4$ in a range from 750 to 1,750 ppm.

14. The method of claim 13, wherein the solution comprises NaCl in a range from 50,000 to 57,000 ppm, $MgCl_2 \cdot 6H_2O$ in a range from 8,000 to 9,000 ppm, $CaCl_2 \cdot 2H_2O$ in a range from 18,000 to 20,000 ppm, and $Na_2SO_4$ in a range from 1,000 to 1,500 ppm.

15. The method of claim 1, wherein the mineral precipitates have a zeta potential in a range from −5 to 25 millivolts (mV).

16. The method of claim 15, wherein the mineral precipitates have a zeta potential in a range from −3 to 20 mV.

17. The method of claim 16, wherein the mineral precipitates have a zeta potential in a range from −1 to 15 mV.

18. The method of claim 1, wherein the concentration of mineral precipitates formed is in a range from 5 to 15 grams per liter (g/L).

19. The method of claim 18, wherein the concentration of mineral precipitates formed is in a range from 7 to 13 g/L.

20. The method of claim 1, wherein the solution comprises the surfactant at a concentration of 1.0 wt. %, based on the total weight of the solution, and wherein the mineral precipitates are in the shape of particles having at least one of a flower-like and a rhombohedral morphology comprising aggregates of at least one of globular and cauliflower-like particles.

\* \* \* \* \*